US 9,286,523 B2

(12) United States Patent
Guan

(10) Patent No.: US 9,286,523 B2
(45) Date of Patent: Mar. 15, 2016

(54) LINE RECOGNITION APPARATUS, LINE RECOGNITION METHOD AND LINE RECOGNITION PROGRAM STORAGE MEDIUM

(71) Applicant: Haike Guan, Kanagawa (JP)

(72) Inventor: Haike Guan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 264 days.

(21) Appl. No.: 14/047,262

(22) Filed: Oct. 7, 2013

(65) Prior Publication Data

US 2014/0098196 A1 Apr. 10, 2014

(30) Foreign Application Priority Data

Oct. 10, 2012 (JP) ................................. 2012-224734
Aug. 19, 2013 (JP) ................................. 2013-169682

(51) Int. Cl.
*H04N 15/00* (2006.01)
*H04N 13/00* (2006.01)
*H04N 9/47* (2006.01)
*H04N 7/18* (2006.01)
*G06K 9/00* (2006.01)
*H04N 13/02* (2006.01)
*G06K 9/46* (2006.01)
*G05D 1/00* (2006.01)
*G05D 3/00* (2006.01)
(Continued)

(52) U.S. Cl.
CPC .......... *G06K 9/00798* (2013.01); *G06K 9/4638* (2013.01); *H04N 7/183* (2013.01); *H04N 13/0239* (2013.01)

(58) Field of Classification Search
USPC ............. 701/1, 9, 10, 11, 23; 348/148, 42, 61
See application file for complete search history.

(56) References Cited

U.S. PATENT DOCUMENTS 6,813,370 B1   11/2004   Arai
2004/0183663 A1   9/2004   Shimakage
(Continued)

FOREIGN PATENT DOCUMENTS

CN   102132335 A   7/2011
CN   102685516 A   9/2012
(Continued)

OTHER PUBLICATIONS

Combined Chinese Office Action and Search Report issued Feb. 17, 2015 in Patent Application No. 201310482453.8 (with English Translation of Category of Cited Documents).
(Continued)

*Primary Examiner* — Daquan Zhao
(74) *Attorney, Agent, or Firm* — Oblon, McClelland, Maier & Neustadt, L.L.P

(57) ABSTRACT

A line recognition apparatus for recognizing a line on a surface over which a vehicle moves, using an image of an area ahead of the vehicle captured by an image capturing unit mounted on the vehicle, includes a dividing line setting unit to set a dividing line in the captured image area ahead of the vehicle to divide the captured image area into a first image area corresponding to a surface close to the vehicle and a second image area in the captured image area corresponding to a surface far from the vehicle; a straight line recognition unit to conduct a linear approximation to an image in the first image area to recognize a straight line; and a curved line recognition unit to conduct a curved line approximation to an image in the second image area to recognize a curved line.

17 Claims, 13 Drawing Sheets

(51) Int. Cl.
*G06F 7/00* (2006.01)
*G06F 17/00* (2006.01)

(56) References Cited

U.S. PATENT DOCUMENTS

| | | | |
|---|---|---|---|
| 2006/0239509 | A1 | 10/2006 | Saito |
| 2010/0299109 | A1* | 11/2010 | Saito ................................. 703/1 |
| 2011/0222732 | A1 | 9/2011 | Higuchi et al. |
| 2011/0238252 | A1* | 9/2011 | Takeda et al. ................... 701/29 |

FOREIGN PATENT DOCUMENTS

| | | |
|---|---|---|
| EP | 1 089 231 A2 | 4/2001 |
| EP | 2 325 824 A1 | 5/2011 |
| JP | 2001-092970 | 4/2001 |
| JP | 2003-157499 | 5/2003 |
| JP | 2013-092975 | 5/2013 |

OTHER PUBLICATIONS

Extended European Search Report issued Dec. 9, 2014, in Patent Application No. 13188067.6.

Cláudio Rosito Jung, et al., "Lane following and lane departure using a linear-parabolic model", Image and Vision Computing, vol. 23, No. 13, XP 027617913, Nov. 29, 2005, pp. 1192-1202.

R. Danescu, et al., "Lane Geometry Estimation in Urban Environments Using a Stereovision System", Proceedings of the IEEE Intelligent Transportation Systems Conference, XP 031151431, Sep. 30-Oct. 3, 2007, pp. 271-276.

Yun Zhang, et al., "Robust lane detection and tracking using improved Hough transform and Gaussian Mixture Model", Proc. of SPIE, vol. 8003, XP 002732258, Dec. 8, 2011, pp. 1-8.

Combined Chinese Office Action and Search Report issued Oct. 10, 2015 in Patent Application No. 201310482453.8 (with English language translation of categories of cited documents).

* cited by examiner

STRAIGHT LINE CANDIDATE AREA TABLE

| PARALLAX THRESHOLD FOR STRAIGHT LINE | ΔTH | | | |
|---|---|---|---|---|
| COORDINATES OF LEFT SIDE AREA | A (x, y) | B (x, y) | C (x, y) | D (x, y) |
| COORDINATES OF RIGHT SIDE AREA | E (x, y) | F (x, y) | G (x, y) | H (x, y) |

FIG. 16A

STRAIGHT LINE CANDIDATE AREA TABLE : EXPRESS HIGHWAY

| PARALLAX THRESHOLD FOR STRAIGHT LINE | $\Delta TH1$ | | | |
|---|---|---|---|---|
| COORDINATES OF LEFT SIDE AREA | A $(x_{1A}, y_{1A})$ | B $(x_{1B}, y_{1B})$ | C $(x_{1C}, y_{1C})$ | D $(x_{1D}, y_{1D})$ |
| COORDINATES OF RIGHT SIDE AREA | E $(x_{1E}, y_{1E})$ | F $(x_{1F}, y_{1F})$ | G $(x_{1G}, y_{1G})$ | H $(x_{1H}, y_{1H})$ |

FIG. 16B

STRAIGHT LINE CANDIDATE AREA TABLE : URBAN ROAD

| PARALLAX THRESHOLD FOR STRAIGHT LINE | $\Delta TH2$ | | | |
|---|---|---|---|---|
| COORDINATES OF LEFT SIDE AREA | A $(x_{2A}, y_{2A})$ | B $(x_{2B}, y_{2B})$ | C $(x_{2C}, y_{2C})$ | D $(x_{2D}, y_{2D})$ |
| COORDINATES OF RIGHT SIDE AREA | E $(x_{2E}, y_{2E})$ | F $(x_{2F}, y_{2F})$ | G $(x_{2G}, y_{2G})$ | H $(x_{2H}, y_{2H})$ |

FIG. 16C

STRAIGHT LINE CANDIDATE AREA TABLE : MOUNTAIN ROAD

| PARALLAX THRESHOLD FOR STRAIGHT LINE | $\Delta TH3$ | | | |
|---|---|---|---|---|
| COORDINATES OF LEFT SIDE AREA | A $(x_{3A}, y_{3A})$ | B $(x_{3B}, y_{3B})$ | C $(x_{3C}, y_{3C})$ | D $(x_{3D}, y_{3D})$ |
| COORDINATES OF RIGHT SIDE AREA | E $(x_{3E}, y_{3E})$ | F $(x_{3F}, y_{3F})$ | G $(x_{3G}, y_{3G})$ | H $(x_{3H}, y_{3H})$ |

FIG. 16D

STRAIGHT LINE CANDIDATE AREA TABLE : SHARP CURVE

| PARALLAX THRESHOLD FOR STRAIGHT LINE | $\Delta TH4$ | | | |
|---|---|---|---|---|
| COORDINATES OF LEFT SIDE AREA | A $(x_{4A}, y_{4A})$ | B $(x_{4B}, y_{4B})$ | C $(x_{4C}, y_{4C})$ | D $(x_{4D}, y_{4D})$ |
| COORDINATES OF RIGHT SIDE AREA | E $(x_{4E}, y_{4E})$ | F $(x_{4F}, y_{4F})$ | G $(x_{4G}, y_{4G})$ | H $(x_{4H}, y_{4H})$ |

LINE RECOGNITION APPARATUS, LINE RECOGNITION METHOD AND LINE RECOGNITION PROGRAM STORAGE MEDIUM

CROSS-REFERENCE TO RELATED APPLICATION

This application claims priority pursuant to 35 U.S.C. §119 to Japanese Patent Application Nos. 2012-224734, filed on Oct. 10, 2012 and 2013-169682, filed on Aug. 19, 2013 in the Japan Patent Office, the disclosures of which are incorporated by reference herein in their entirety.

BACKGROUND

1. Technical Field

The present invention relates to a line recognition apparatus, a line recognition method and a line recognition program that recognizes lines on a surface over which a vehicle is moving based on an image of an area ahead of the vehicle captured by an image capturing unit.

2. Background Art

A target recognition apparatus that recognizes a target based on images of scenes ahead of a vehicle, captured by an image capturing unit, is used in driver assistance systems such as adaptive cruise control (ACC) to reduce the burden on the driver. The driver assistance system can provide various capabilities such as automatic braking and alarm to avoid a collision or reduce the impact at collision. The driver assistance system can further provide assistance in the form of driving speed adjustment to maintain a safe distance to a vehicle ahead, and a lane deviation prevention function that detects the lane on the road surface to prevent the vehicle from drifting into another lane, in which the lane is a line that defines a boundary on the road surface over which the vehicle moves.

JP-3352655-B (JP-2001-092970-A) discloses a lane recognition apparatus that can recognize the lane on the road surface. This lane recognition apparatus includes a stereo image capturing unit that can capture images of scenes ahead of a vehicle, and the captured image corresponding to one screen image is divided into a plurality of areas. Each of the areas is then divided by a virtual horizontal line set on the screen image, wherein the virtual horizontal line can be set based on the distance from the vehicle position, which is computed based on a captured stereo image. Then, based on a luminance image for each area, a luminance edge corresponding to a lane edge is extracted and linear approximation is performed on the extracted luminance edge to recognize the lane image, wherein the lane is a white line.

The lane recognition apparatus of JP-3352655-B (JP-2001-092970-A) extracts the luminance edge in each area of the image obtained by capturing the white line on the road surface, and uses linear approximation on the extracted luminance edge to recognize the white line image on the road surface. However, if the lane curves, the acquired image may be greatly deviated from the actual line, which is not good enough for a driver assistance system.

SUMMARY

In one aspect of the present invention, a lane recognition apparatus for recognizing a line on a surface over which a vehicle moves, using an image of an area ahead of the vehicle captured by an image capturing unit mounted to the vehicle is devised. The line recognition apparatus includes a dividing line setting unit to set a dividing line in the captured image area ahead of the vehicle to divide the captured image area into a first image area corresponding to a surface close to the vehicle and a second image area in the captured image area corresponding to a surface far from the vehicle; a straight line recognition unit to conduct a linear approximation to an image in the first image area to recognize a straight line in the captured image area ahead of the vehicle; and a curved line recognition unit to conduct a curved line approximation to an image in the second image area to recognize a curved line in the captured image area ahead of the vehicle.

In another aspect of the present invention, a method of recognizing a line on a surface over which a vehicle moves, using an image of an area ahead of the vehicle captured by an image capturing unit mounted on the vehicle is devised. The method includes the steps of setting a dividing line in the captured image area ahead of the vehicle to divide the captured image area into a first image area corresponding to a surface close to the vehicle and a second image area in the captured image area corresponding to a surface far from the vehicle; conducting a linear approximation to an image in the first image area to recognize a straight line in the captured image area ahead of the vehicle; and conducting a curved line approximation to an image in the second image area to recognize a curved line in the captured image area ahead of the vehicle.

In another aspect of the present invention, a non-transitory computer-readable storage medium storing a line recognition program that, when executed by a computer having a processor, causes the computer to execute a method of recognizing a line on a surface over which a vehicle moves, using an image of an area ahead of the vehicle captured by an image capturing unit mounted on the vehicle is devised. The method includes the steps of setting a dividing line in the captured image area ahead of the vehicle to divide the captured image area into a first image area corresponding to a surface close to the vehicle and a second image area in the captured image area corresponding to a surface far from the vehicle; conducting a linear approximation to an image in the first image area to recognize a straight line in the captured image area ahead of the vehicle; and conducting a curved line approximation to an image in the second image area to recognize a curved line in the captured image area ahead of the vehicle.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 16A, 16B, 16C and 16D show straight line candidate area tables of the second example embodiment;

Figure 1:
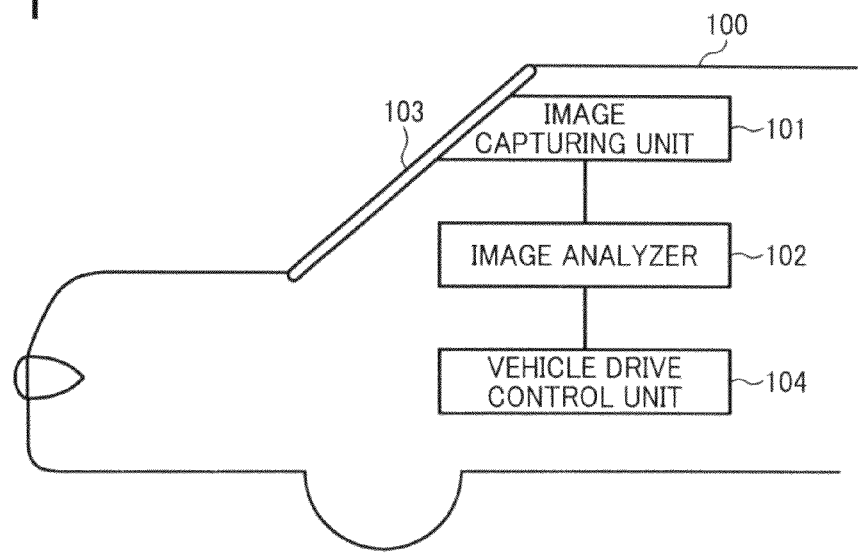
FIG. 1 is a schematic configuration of a vehicle-mounted device control system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

A description is given of a control system to control vehicle-mounted devices according to an example embodiment, in which an image capturing device is installed in a vehicle. The image capturing device can be used with the control system to control vehicle-mounted devices, but the image capturing device can be applied for other systems having an object detector or object detection apparatus to conduct the detection of objects based on captured images, which may be captured by the image capturing device. The vehicle may not be limited to any specific vehicles but may include various types of mobile vehicles such as automobiles, robots or the like.

A description is given of a line recognition apparatus that can recognize lines on surfaces over which an object such as a vehicle moves according to an example embodiment of the present invention. For example, the line recognition apparatus can be used to recognize a line on a surface such as a lane (e.g., white line) on a road surface. Although the following example embodiments may use a white lane on a road surface, other line on other surface can be processed. The line recognition apparatus can be employed for a vehicle system such as a vehicle-mounted device control system. Further, the line recognition apparatus can be employed for other than the vehicle-mounted device control system. For example, the line recognition apparatus can be employed for other system mounted with an object detection apparatus that conducts an object detection based on a captured image.

FIG. 1 shows a schematic configuration of a vehicle-mounted device control system according to an example embodiment. The vehicle-mounted device control system includes an image capturing unit 101, used as an image capturing device, to capture an image of area ahead of a vehicle 100 moving (e.g., running) in a given direction. The area ahead of the vehicle 100 may be referred to as an image capturing area, a captured image area ahead of the vehicle or a captured image area, as required. The image capturing unit 101 is mounted, for example, near a rear-view mirror disposed at a windshield 103 of the vehicle 100.

Various data such as image data captured by the image capturing unit 101 is input to the image analyzer 102 used as an image processing unit. The image analyzer 102 analyzes the data, transmitted from the image capturing unit 101, in which the image analyzer 102 can be used to compute information of other vehicle existing ahead of the vehicle 100 such as vehicle position, a point of the compass (e.g., north, south, east, west), and distance to other vehicle, and can be used to detect the lane such as white line on the road surface existing in the image capturing area. When other vehicle is to be detected as a target, the other vehicle on the road surface can be detected using a parallax image.

Further, the computation result of the image analyzer 102 is transmitted to a vehicle drive control unit 104. The vehicle drive control unit 104 can provide a cruise assist control based on a detection result of a recognition target object such as pedestrian and other vehicle detected by the image analyzer 102. Specifically, when the vehicle 100 is to be collided with an object, the vehicle drive control unit 104 conducts the cruise assist control such as reporting a warning to a driver of the vehicle 100 and controlling the steering and brakes of the vehicle 100. This vehicle drive control unit 104 can be referred to as the vehicle controller.

Figure 2:
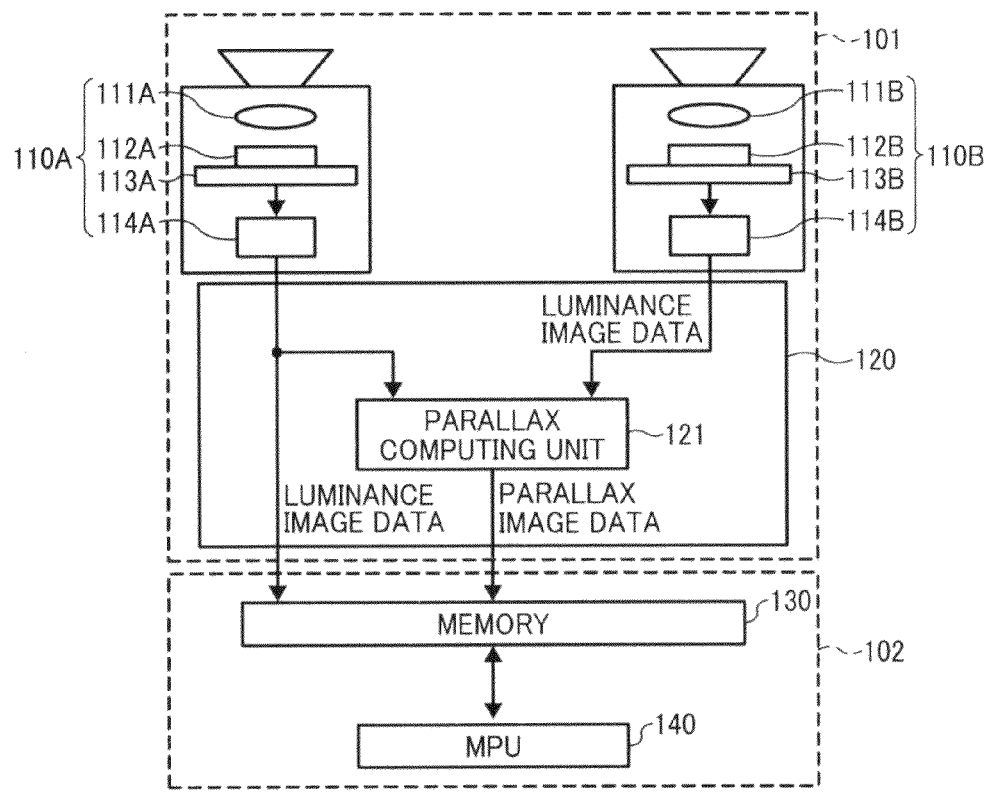
FIG. 2 is a schematic configuration of an image capturing unit and an image analyzer.

FIG. 2 shows a schematic configuration of the image capturing unit 101 and the image analyzer 102. The image capturing unit 101 is, for example, a stereo camera having a first capturing unit 110A and a second capturing unit 110B, in which the first capturing unit 110A and the second capturing unit 110B have the same configuration. The first capturing unit 110A is configured with a first capturing lens 111A, a first image sensor 112A, a first sensor board 113A, and a first signal processor 114A. The second capturing unit 110B is configured with a second capturing lens 111B, a second image sensor 112B, a second sensor board 113B, and a second signal processor 114B.

The first sensor board 113A is disposed with the first image sensor 112A having arranged image capturing elements two-dimensionally, and the second sensor board 113B is disposed with the second image sensor 112B having arranged image capturing elements two-dimensionally.

The first signal processor 114A converts analog electrical signals output from the first sensor board 113A (i.e., light quantity received by light receiving elements on the first image sensor 112A) to digital signals to prepare captured image data, and outputs the captured image data. The second signal processor 114B converts analog electrical signals output from the second sensor board 113B (i.e., light quantity received by light receiving elements on the second image sensor 112B) to digital signals to prepare captured image data, and outputs the captured image data. The image capturing unit 101 can output luminance image data.

Further, the image capturing unit 101 includes a processing hardware 120 such as field-programmable gate array (FPGA). The processing hardware 120 includes a parallax computing unit 121 to obtain parallax image from the luminance image data output from the first capturing unit 110A and the second capturing unit 110B. The parallax computing unit 121 computes the parallax between an image captured by the first capturing unit 110A and an image captured by the second capturing unit 110B by comparing a corresponding image portion on the captured images. The value of parallax can be computed using one image captured by one of the first and second capturing units 110A and 110B as a reference image and other image captured by other one of the first and second capturing units 110A and 110B as a comparing image. In the image capturing area, a concerned image portion at the same point of the reference image and the comparing image are compared to compute a positional deviation between the reference image and the comparing image as the parallax of the concerned image portion. By using fundamental of triangulation, the distance to the same point of the concerned image portion in the image capturing area can be computed based on the parallax.

The image analyzer 102 includes, for example, a memory 130, and a micro processing unit (MPU) 140. The memory 130 stores luminance image data and parallax image data output from the image capturing unit 101. The MPU 140 installs software used for the recognition processing of recognition target and controlling the parallax calculation. The MPU 140 conducts various recognition processing such as recognition of white line on the road surface using the luminance image data and parallax image data stored in the memory 130.

Figure 3:
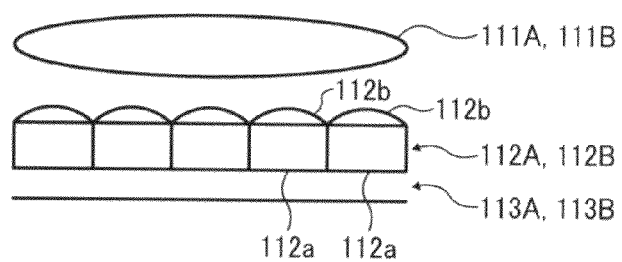
FIG. 3 is a schematic configuration of an image sensor of an image capturing unit viewed from a direction perpendicular to a light transmission direction.

FIG. 3 shows a schematic configuration of the first image sensor 112A and the second image sensor 112B viewed from a direction perpendicular to a light transmission direction. Each of the first image sensor 112A and the second image sensor 112B is an image sensor using, for example, a charge coupled device (CCD), a complementary metal oxide semiconductor (CMOS) or the like. The image capturing element (or light receiving element) of the image sensors 112A and 112B employs, for example, a photodiode 112a. The photodiode 112a is disposed for each of image capturing pixels by arraying the photodiodes 112a two-dimensionally. Further, a micro lens 112b is disposed at an incidence side of each of the photodiodes 112a to increase light condensing efficiency. The first image sensor 112A and the second image sensor 112B are bonded to a printed wiring board (PWB) using wire bonding or the like, with which the first sensor board 114A and the second sensor board 114B are formed.

A description is given of a line recognition apparatus for recognizing line on a surface such as white line (e.g., lane) on a road surface, which is an example of line recognition apparatus employed for vehicle such as automobile moving on a surface such as the road surface according to an example embodiment. For the simplicity of expression, the line recognition apparatus for recognizing line on the surface may be referred to as the line recognition apparatus.

First Example Embodiment

Figure 4:
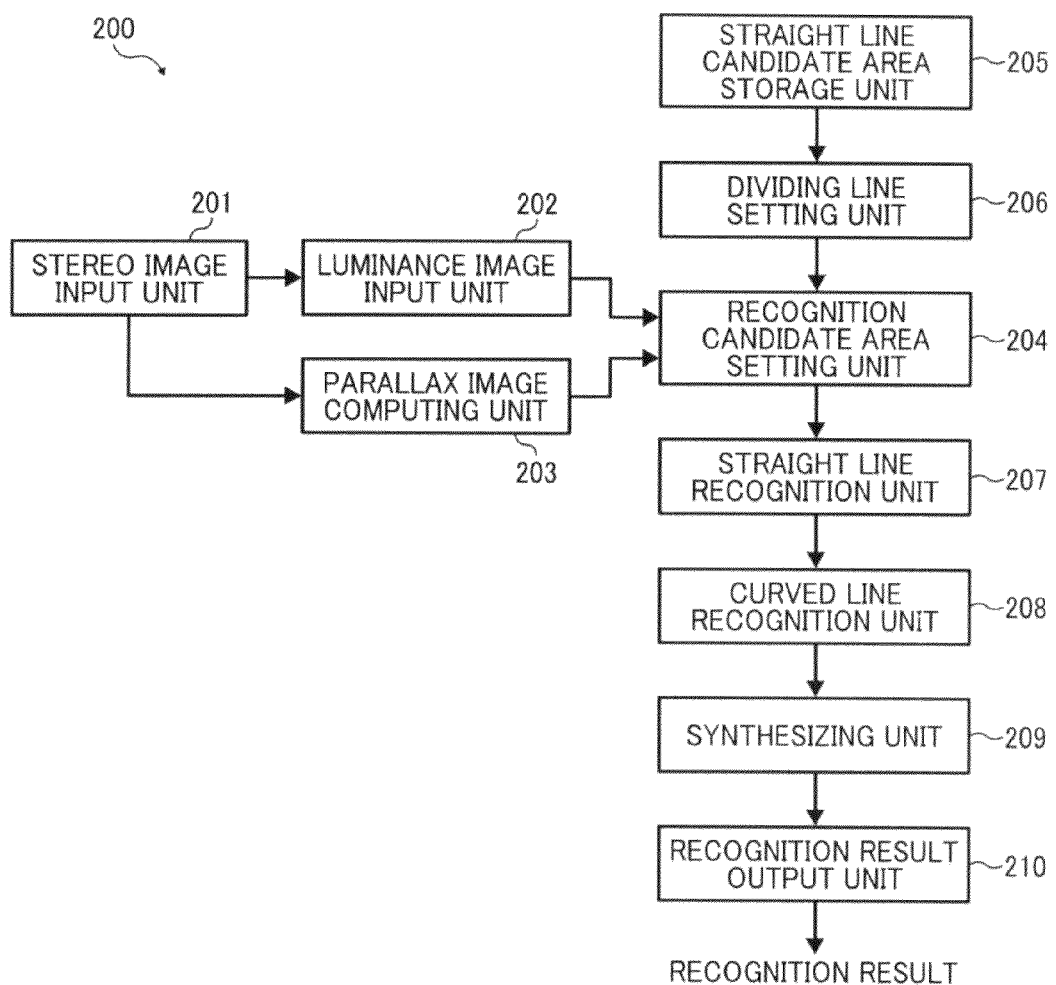
FIG. 4 is a block diagram of a line recognition apparatus of a first example embodiment.

A description is given of a recognition apparatus for recognizing line on the road surface according to a first example embodiment with reference to FIG. 4, which is a block diagram of a line recognition apparatus 200 of the first example embodiment. The line recognition apparatus 200 can be configured using the processing hardware 120 and the image analyzer 102 shown in FIG. 2. As shown in FIG. 4, the white line recognition apparatus 200 includes, for example, a stereo image input unit 201, a luminance image input unit 202, a parallax image computing unit 203, a recognition candidate area setting unit 204, a straight line candidate area storage unit 205, a dividing line setting unit 206, a straight line recognition unit 207, a curved line recognition unit 208, a synthesizing unit 209 and a recognition result output unit 210.

The stereo image input unit 201 is input with a stereo image from the stereo camera including the first capturing unit 110A and the second capturing unit 110B having the image capture lens and the image sensor shown in FIG. 2.

The luminance image input unit 202 is input with a luminance image from the stereo image input unit 201, wherein the luminance image can be obtained from one of a left image and a right image composing the stereo image. The input stereo image and the luminance image can be stored, for example, in a memory of the stereo camera.

The parallax image computing unit 203, used as a parallax image computing unit corresponding to the parallax computing unit 121 of the processing hardware 120 shown in FIG. 2, computes parallax of the left and right images of a captured target image using the stereo image input to the stereo image input unit 201, wherein the parallax is a difference of focal positions of the left and right images.

The recognition candidate area setting unit 204 sets a virtual horizontal line, corresponding to a given distance from the vehicle 100 on the screen as a dividing line on a parallax image prepared from pixel data having a parallax value, computed by the parallax image computing unit 203, and divides the image area into two recognition candidate areas using the dividing line. The dividing line can be determined using a given parallax threshold.

Figures 5, 6:
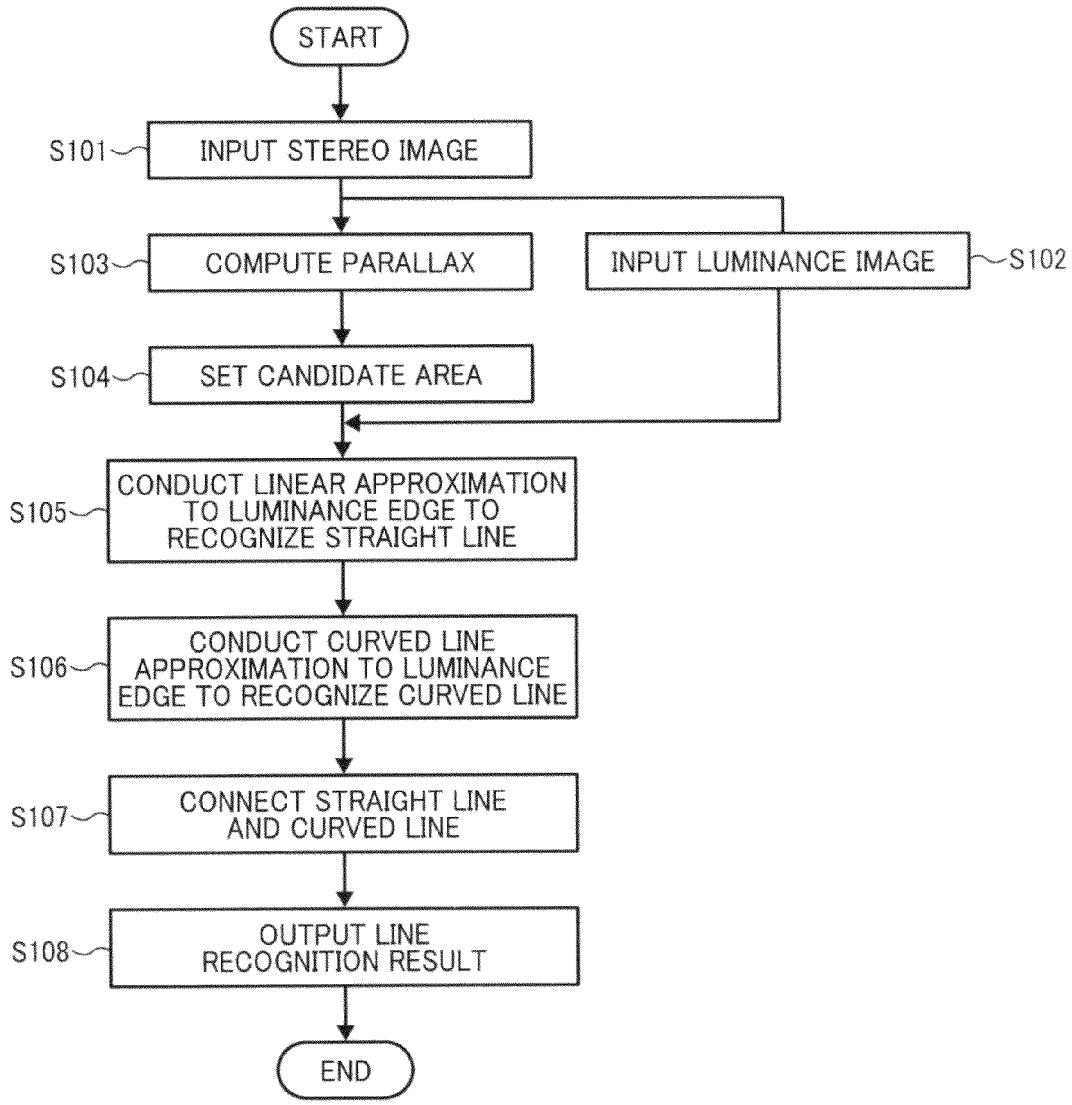
FIG. 5 is a straight line candidate area table of the first example embodiment.
FIG. 6 is a flow chart of a recognition process performed by a line recognition apparatus of the first example embodiment.

The straight line candidate area storage unit 205, used as a storage, stores the above mentioned given parallax threshold ΔTH, coordinates of points A, B, C and D (FIG. 9) that define a straight line candidate area in a left side of a surface on a luminance image, and coordinates of points E, F, G and H (FIG. 9) that define a straight line candidate area in a right side of a surface on a luminance image on a memory table as shown in FIG. 5.

The dividing line setting unit 206 sets the above mentioned dividing line using the parallax threshold ΔTH, stored in the straight line candidate area storage unit 205, on a parallax image.

The straight line recognition unit 207, used as a boundary straight line recognition unit, recognizes a straight line portion in an image of a surface on a recognition candidate area close to the vehicle 100 on the luminance image, set by the recognition candidate area setting unit 204.

The curved line recognition unit 208, used as a boundary curved line recognition unit, recognizes a curved line portion in an image of a surface on a recognition candidate area far from the vehicle 100, set by the recognition candidate area setting unit 204.

The synthesizing unit 209 synthesizes a recognition result by the straight line recognition unit 207, which is a straight line portion in an image of a surface and a recognition result by the curved line recognition unit 208, which is a curved line portion in an image of a surface by connecting the straight line portion and the curved line portion to prepare a line recognition result. The recognition result output unit 210 outputs a line recognition result.

Figure 7:
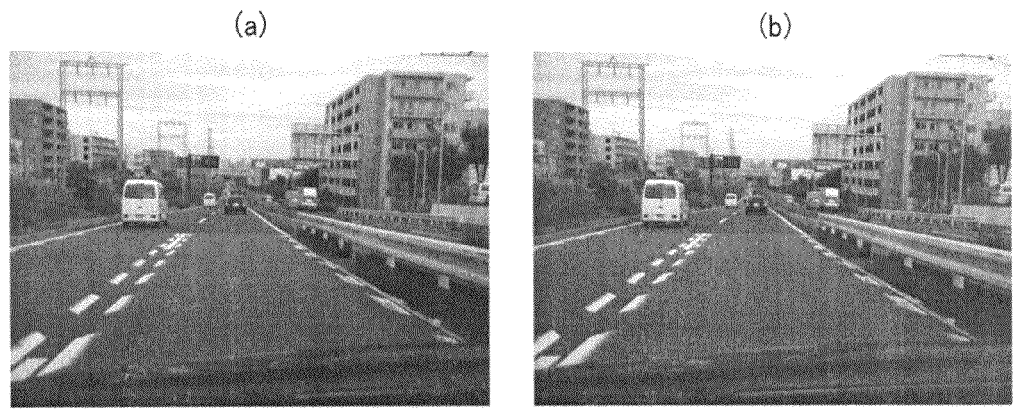
FIG. 7(a) is a left image of a stereo image captured with a first capturing unit.
FIG. 7(b) is a right image of a stereo image captured with a second capturing unit.

A description is given of recognition processing performed by the line recognition apparatus of the first example embodiment with reference to FIG. 6, which is a flow chart of the recognition process. FIG. 7 shows the stereo image of a forward area of the vehicle 100 captured with the stereo camera shown in FIG. 2. FIG. 7(a) is a left image captured with the first capturing unit 110A shown in FIG. 2, and FIG. 7(b) is a right image captured with the second capturing unit 110B shown in FIG. 2.

As shown in FIG. 6, the stereo image input unit 201 (FIG. 4) is input with a stereo image of an area captured ahead of the vehicle 100 (step S101). Specifically, the stereo image shown in FIG. 7 is input to the stereo image input unit 201 from the stereo camera mounted on the vehicle 100. As for the stereo image, the same object is focused at different focal positions with the above described left and right image sensors.

Then, a luminance image, obtained from one of the left image (FIG. 7(a)) and the right image (FIG. 7(b)) of the stereo image, is input to the luminance image input unit 202 of FIG. 4 (step S102). The input stereo image and luminance image can be stored, for example, in a memory of the stereo camera.

Figure 8:
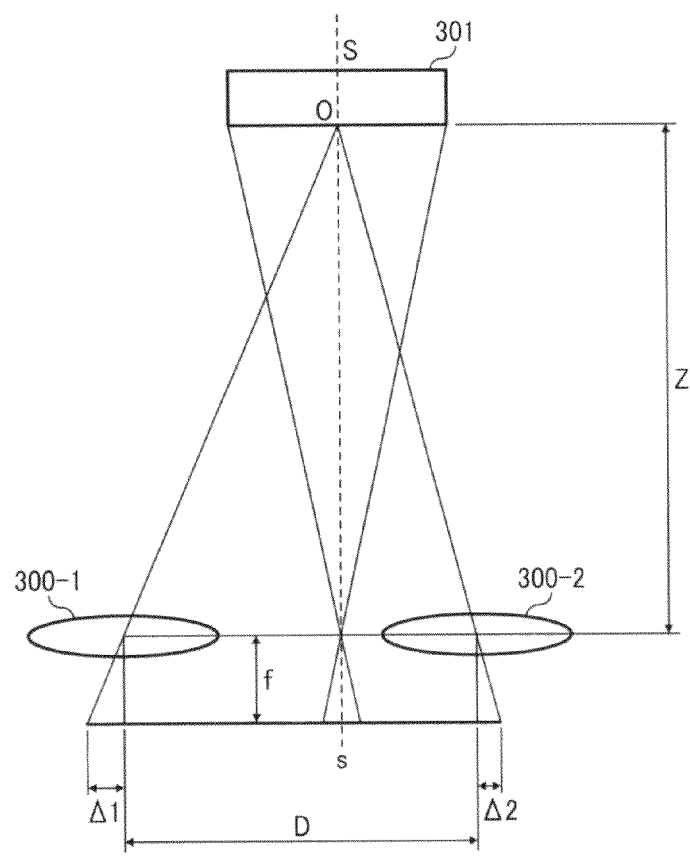
FIG. 8 is a scheme of computing distance.

The parallax image computing unit 203 computes parallax, which is a difference of focal positions of the left and right images captured for the target object using the stereo image input to the stereo image input unit 201 (step S103). Specifically, the block matching algorithm is applied to the same portion of the stereo image focused with the left and right image capture lenses to compute a parallax image by converting parallax value to pixel value. In the block matching algorithm, each of the left and right images is divided into a plurality of blocks, and when similarities of blocks at the left and right images becomes the greatest, a value of parallax is computed for the blocks that are matched. For example, an image of 1280×960 pixels can be divided by 5×5 pixel-size block. The parallax value is computed for each divided block. The size of block can be set based on experiments. The parallax value can computed using the fundamental of triangulation as shown in FIG. 8, in which with respect to the point O on the object, distance $\Delta 1$ and distance $\Delta 2$ between the focal position and focal center for the left and right images are computed, with which the parallax value $\Delta$ can be computed as $\Delta = \Delta 1 + \Delta 2$. With this processing, the parallax value can computed for each pixel, and the parallax image using the pixel value obtained from the parallax value can be prepared.

Then, the dividing line setting unit 206 reads out the parallax threshold $\Delta TH$ from the straight line candidate area storage unit 205, and detects pixels having a parallax value, which is the same as the parallax threshold $\Delta TH$ or more, on the parallax image. Among the pixels having the parallax value, which is the same as the parallax threshold $\Delta TH$ or more, a plurality of pixels existing on an upper part of the parallax image are connected by a virtual horizontal line, and sets this virtual horizontal line as a dividing line.

The recognition candidate area setting unit 204 divides an entire image of the luminance image into two areas using the dividing line as shown in FIG. 9, in which a part lower than the dividing line in the luminance image is referred to as a first surface line candidate area 401, and a part higher than the dividing line in the luminance image is referred to as a second surface line candidate area 402.

Further, based on coordinates of the points A and B to define a straight line candidate area for a left side of a surface on the luminance image, stored in the straight line candidate area storage unit 205, coordinates of the points E and F to define a straight line candidate area for a right side of a surface on the luminance image, stored in the straight line candidate area storage unit 205, and the above set dividing line, coordinates of the points A, B, E and F on the luminance image are computed.

Further, based on coordinates of the points C and D to define a straight line candidate area for a left side of a surface on the luminance image, stored in the straight line candidate area storage unit 205, and coordinates of the points G and H to define a straight line candidate area for a right side of a surface on the luminance image, stored in the straight line candidate area storage unit 205, coordinates of the points C, D, G, and H on the luminance image are computed.

Figure 9A:
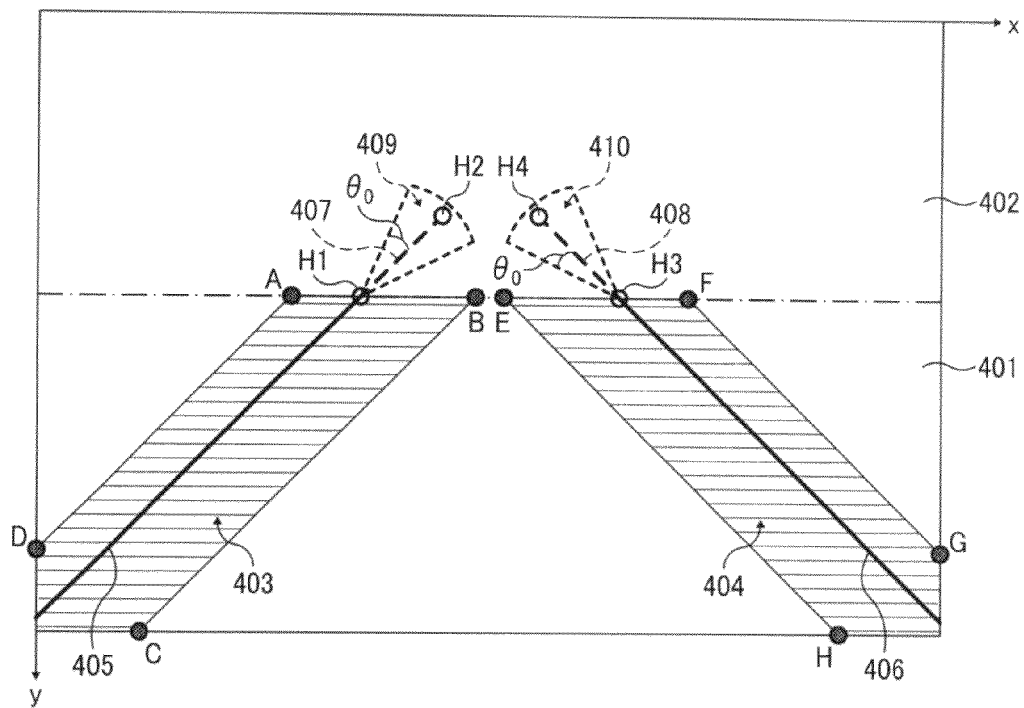
FIGS. 9A and 9B are a scheme of a linear approximation and a curved line approximation on a luminance image.

As shown in FIG. 9A, a first straight line candidate area 403 encircled by the computed points A, B, C and D is set, and a second straight line candidate area 404 encircled by the computed points E, F, G and point H is set (step S104). The binary processing is conducted for the first straight line candidate area 403 and the second straight line candidate area 404 to compute a luminance edge. By conducting the linear approximation to the luminance edge using, for example, the Hough conversion, a first straight line 405 for the left side of a surface and a second straight line 406 for the right side of a surface can be recognized (step S105).

Then, as shown in FIG. 9A, the curved line recognition unit 208 (FIG. 4) conducts an extraction processing of the luminance edge on the luminance image, in which the extraction processing of the luminance edge is conducted near a first extension line 407 extended from the first straight line 405, and near a second extension line 408 extended from extension line from the second straight line 406 recognized by the straight line recognition unit 207. The curved line approximation using the polynomial approximation is performed on the extracted luminance edge (step S106). The polynomial approximation is suitable for complex curved line approximation that increases the order depending on data amount indicating the curved line.

Figure 9B:
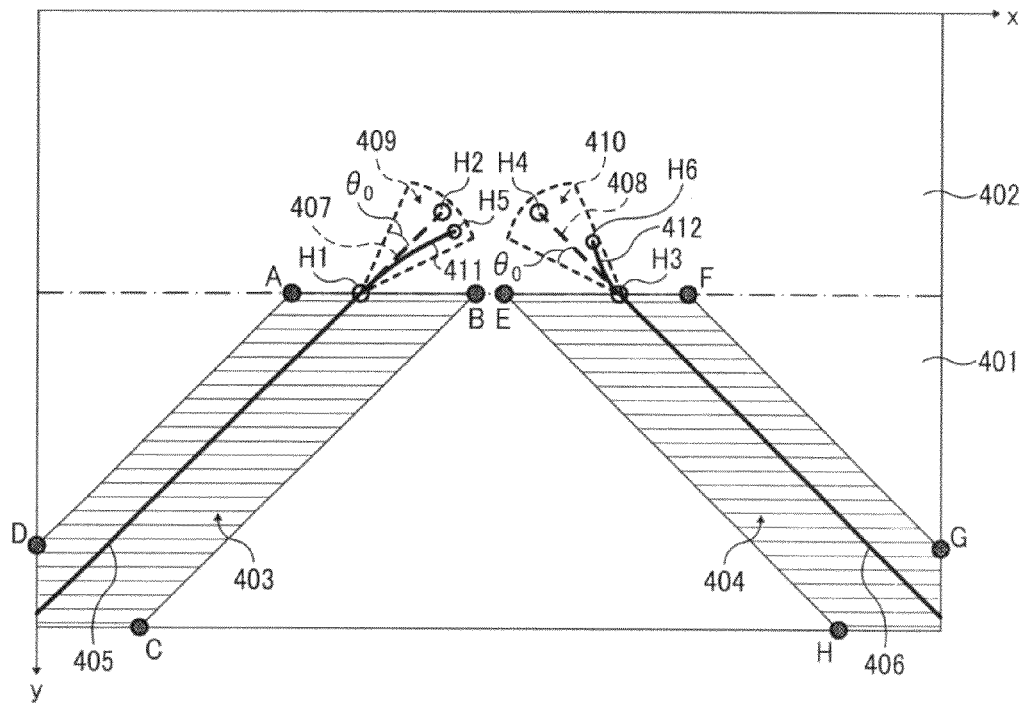

A description is given to recognition of curved line on the surface. As shown in FIG. 9B, a virtual line such as the first extension line 407 is set by connecting a point H1 (i.e., an intersect of the first straight line 405 and the dividing line) and a search point H2 extended from the point H1 for a given distance, and further, a virtual line such as the second extension line 408 is set by connecting a point H3 (i.e., an intersect of the second straight line 406 and the dividing line) and a search point H4 extended from the point the point H3 for a given distance.

Further, a given search angle $\theta_0$ is set for the first extension line 407 (i.e., virtual line) using the point H1 as a top, and a given search angle $\theta_0$ is set for the second extension line 408 (i.e., virtual line) using the point H3 as a top.

Based on the above given search points and given search angle, a first search area 409 originating from the point H1, and a second search area 410 originating from the point H3 are set. The first search area 409 and second search area 410 are indicated by small-dot lines in FIG. 9. Then, curve-line-candidate pixels are searched in the first search area 409 and the second search area 410 using the polynomial approximation, and a first curved line 411 and a second curved line 412 can be recognized by connecting the candidate pixels.

Further, another curved line on the surface can be recognized as follows. In the next or subsequent recognition process of curved line portion on the surface, a point H5 where the first curved line 411 intersects in the first search area 409, and a point H6 where the second curved line 412 intersects in the second search area 410 are searched.

Figure 10:
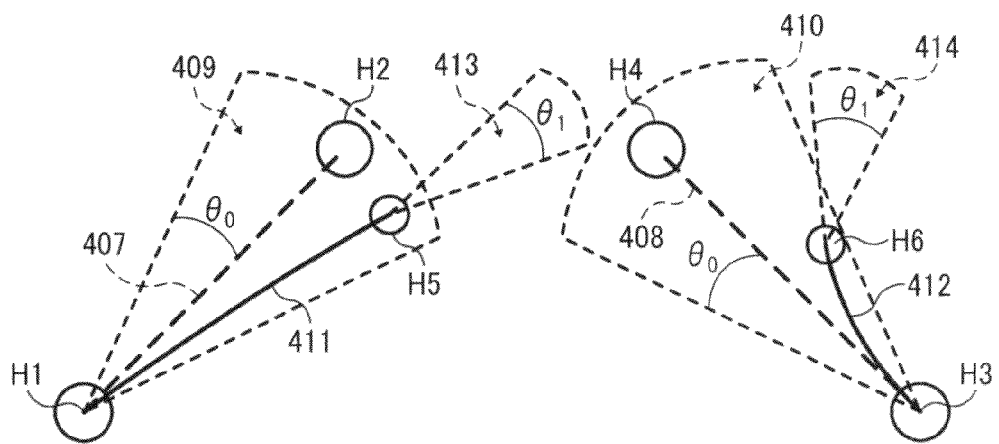
FIG. 10 is a scheme of a sequentially conducted curved line approximation.

As shown in FIG. 10, using the points H5 and H6 as an originating point, a third search area 413 and a fourth search area 414 having a given search angle θ1 can be set. The curved line approximation is performed on the luminance edge in the search area using the polynomial approximation to search candidate pixels for the curved line portion on the surface. By connecting the searched candidate pixels, the curved line portion on the surface can be recognized.

In the above process, a pixel point intersecting the recognized curved line portion on the surface and a search area can be used as an originating point to set a search angle, with which a subsequent search area can be set. The search area may be sequentially set one by one with this processing, and in each search area, the curved line approximation is performed on recognize a curved line portion on the surface in the second surface line candidate area 402 shown in FIG. 9.

As for the curved line approximation, an end point of a straight line or curved line is used as an originating point to set a search area set with a search angle, and edge extraction is conducted in the search area using the curved line approximation.

Further, the curved line approximation can be conducted in another way, in which an end point of a straight line portion or curved line portion is used as an originating point, and edge extraction is conducted in a rectangular search area including at least the end point using the curved line approximation. Similar to the above, the curved line search is repeated by using one of the tops of the rectangle as an originating point.

The synthesizing unit 209 (FIG. 4) synthesizes the recognized straight line portion and curved line portion on the surface by connecting the straight line portion and the curved line portion (step S107). The recognition result output unit 210 (FIG. 4) outputs a recognition result such as a first recognized line 501 and a second recognized line 502 shown in FIG. 11 (step S108).

If the search area has noise and a plurality of curved lines when recognizing the curved line portion on the surface, the extraction precision of curved line portion on the surface becomes low. Because isolated noise points increase error in the approximation when the polynomial approximation is used, the isolated noise points are removed.

A description is given of a learning method of average parallax, and the first straight line candidate area 403 and the second straight line candidate area 404 with reference to FIG. 9. In this process, a luminance image including a line image on surface such as white line image on a road surface input in advance is used to compute an average parallax for a straight line. Specifically, an average parallax between the point H1 (i.e., end point of the first straight line 405) and the point H3 (i.e., end point of the second straight line 406) is computed. The computed average parallax is stored in the straight line candidate area table shown in FIG. 5 as the parallax threshold.

As for the first straight line candidate area 403 and the second straight line candidate area 404, based on an image including a straight line image input in advance, the straight line portion is input, and an average of coordinates of the input straight line, corresponding to coordinates of tops of the first straight line candidate area 403 and the second straight line candidate area 404, is stored in the straight line candidate area table as shown in FIG. 5. If a position of the parallax threshold ΔTH, a height of a straight line connecting the points A and B, and a height of a straight line connecting the points E and F are different, a value of parallax at a lower position is used as the parallax threshold.

Figure 12:
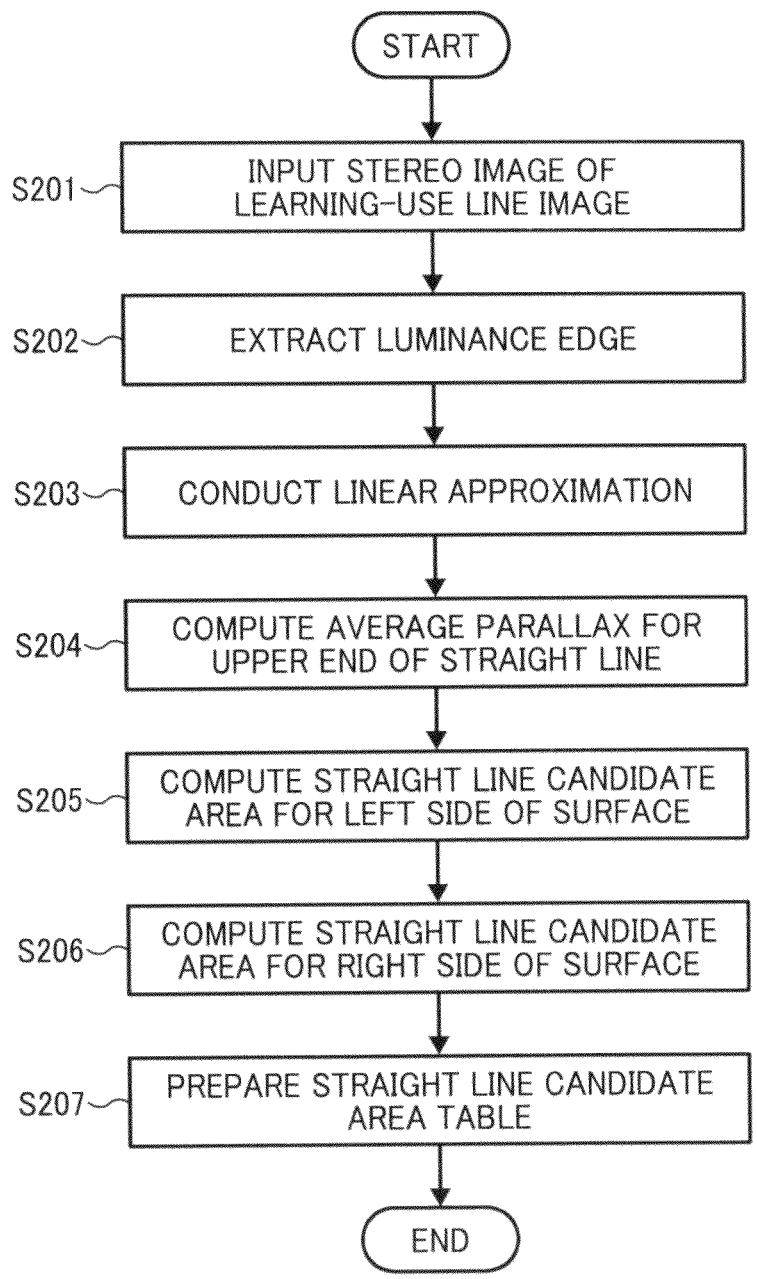
FIG. 12 is a flow chart of a process of preparing a straight line candidate area table.

A description is given of a process of preparing of the straight line candidate area table shown in FIG. 5 with reference to FIG. 12, which is a flow chart of preparing the straight line candidate area table. At first, a stereo image of learning-use line image on a surface is captured and input (step S201). A luminance edge is extracted in a luminance image, which is one of left and right images (step S202). The linear approximation is performed on the extracted luminance edge to approximate a straight line (step S203). Then, the average parallax for the upper end of the straight line obtained by the approximation is computed (step S204), and the computed average parallax is used as the parallax threshold. Then, a straight line candidate area for the left side of the surface and a straight line candidate area for the right side of the surface are computed and set (steps S205 and S206).

Coordinates of the points A, B, C, and D that define a straight line candidate area for the left side of the surface on a luminance image and coordinates of the points E, F, G, and H that define a straight line candidate area for the right side of the surface on the luminance image are set using the following setting process of a straight line candidate area, with which the straight line candidate area table storing these coordinates and the parallax threshold can be prepared (step S207).

Figure 13:
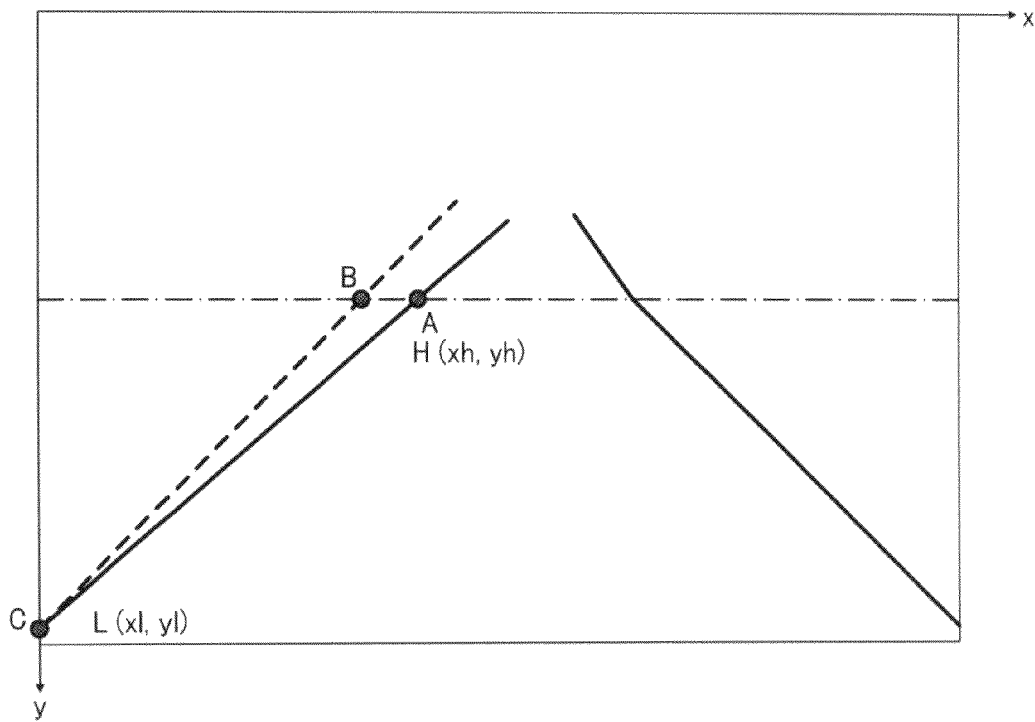
FIG. 13 is an example of edge extraction processing on a luminance image.

A description is given of a setting process of the straight line candidate area. The edge extraction filtering is conducted using, for example, Sobel filtering that can detect the outline. FIG. 13 shows an extraction processing result. In FIG. 13, the solid line indicates a candidate straight line on the left side of the surface, and the dotted line indicates an approximated straight line on the left side of the surface.

The linear approximation of straight line on the left side of the surface is conducted on a luminance image of a sample image based on an extracted luminance edge, in which the linear approximation of straight line is conducted using, for example, Hough conversion.

The root mean square error (RMSE) of distance in the horizontal direction is computed between the extracted straight line (dotted line) on the left side of the surface and a candidate straight line (solid line) on the left side of the surface generated by connecting candidate points. If the RMSE becomes a given set threshold TH or less, a line at the left side of the surface in this learning-use sample is determined as a straight line or a straight line.

The RMSE can be computed using a following formula (1).

$$RMSE = \sqrt{\frac{1}{n}\sum_{i=1}^{n}(xi - xli)^2} \quad (1)$$

xi is "x coordinates" of candidate straight line (solid line) on the height y, and xli is "x coordinates" of approximated straight line on the height y. By changing the height y for changing the length of candidate straight line AC (solid line), the formula (1) is computed. If the following formula (2) is satisfied, the line CB in FIG. 13 is determined as an approximated straight line.

$$RMSE \leq TH \tag{2}$$

The line CB in FIG. 13 is used as a straight line portion for the line at the left side of the surface in this learning-use sample. Similarly, the straight line portion for the line at the right side of the surface is extracted.

The threshold TH is a parameter set with, for example, seven pixels. By adjusting the threshold TH, the length of straight line portion can be adjusted. The smaller the threshold TH, the shorter the length of straight line portion, and the greater the threshold TH, the longer the length of straight line portion.

Figure 14:
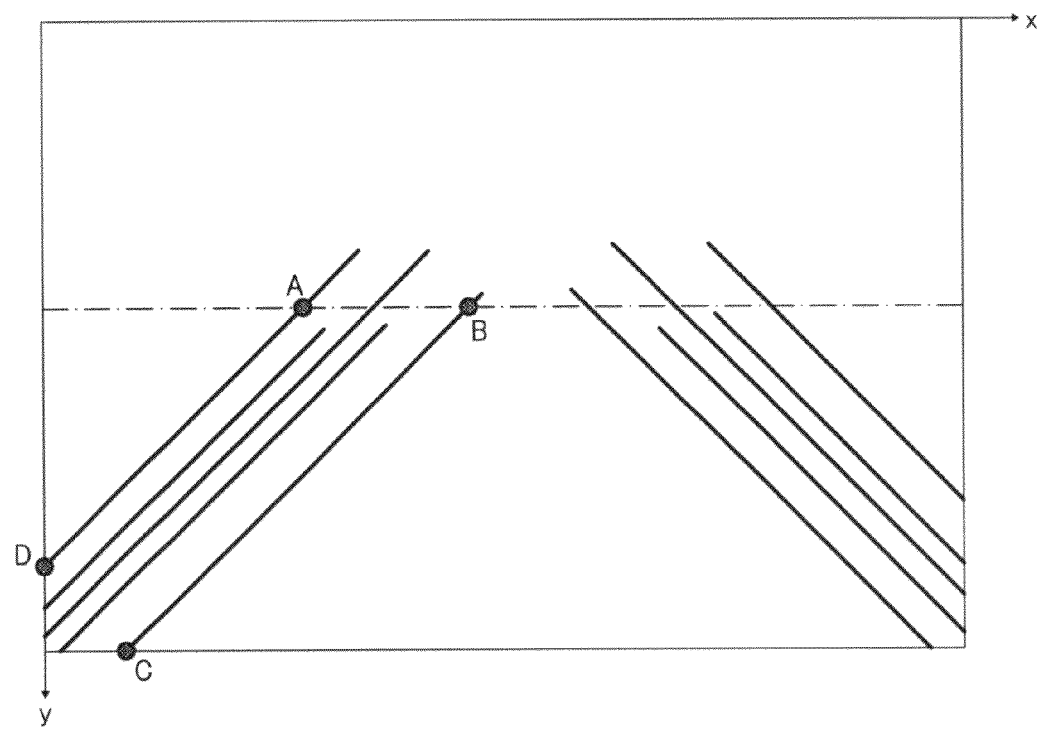
FIG. 14 shows a result of straight lines computed using image samples of a plurality of learning-use samples.

FIG. 14 shows a result of straight line portions at the left and right sides of the surface computed using line image samples of a plurality of learning-use samples. The RMSE of straight line of each of learning-use samples and the candidate straight line corresponds to a straight line portion extracted based on the condition of the above formula (2). Then, as shown in FIG. 13, coordinates of the points A and C (both end points) of the extracted straight line portion is defined. A value of parallax on a parallax image corresponding to the point A at the upper end of the straight line portion is set as $\Delta i$. The above process is conducted for "n" line image samples on the surface (n: positive whole number). Straight line portions are extracted from the candidate line at the right side of the surface, and at then top coordinates of each straight line corresponding to straight line portions of the line image samples of the obtained image samples at left and right learning-use samples of the surface, the average parallax value A of the parallax value $\Delta i$ can be computed using the following formula (3)

$$\Delta = \frac{1}{n} \sum_{j=1}^{n} \Delta i \tag{3}$$

A virtual horizontal line is drawn on positions of the average parallax $\Delta$. An intersecting point of the most left straight line in the candidate straight line computed in straight line image of each of the learning-use samples and the virtual horizontal line is set as the point A ($xh_{min}$, yh), and an intersecting point of the most right straight line in the candidate straight line computed in straight line of image each of the learning-use samples and the virtual horizontal line is set as the point B ($xh_{max}$, yh) as shown in FIG. 14. The intersecting points of the lower end of the each straight line with the frame of image are set as the points C and D.

Similarly, the top points E and F are computed using the average parallax $\Delta$ in the straight line portion at the right side, and the intersecting points of the lower end of the each straight line with the frame of image are set as the point G and H.

The above obtained coordinates of the points A, B, C and D are stored in the straight line candidate area table of FIG. 5 as coordinates of the points A, B, C and D that define a straight line candidate area for the left side of the surface. Further, the obtained coordinates of the points E, F, G and H are stored in the straight line candidate area table of FIG. 5 as coordinates of the points E, F, G and H that define a straight line candidate area for the right side of the surface. Further, the value of average parallax is stored in the straight line candidate area table of FIG. 5 as the parallax threshold $\Delta TH$.

Second Example Embodiment

Figure 15:
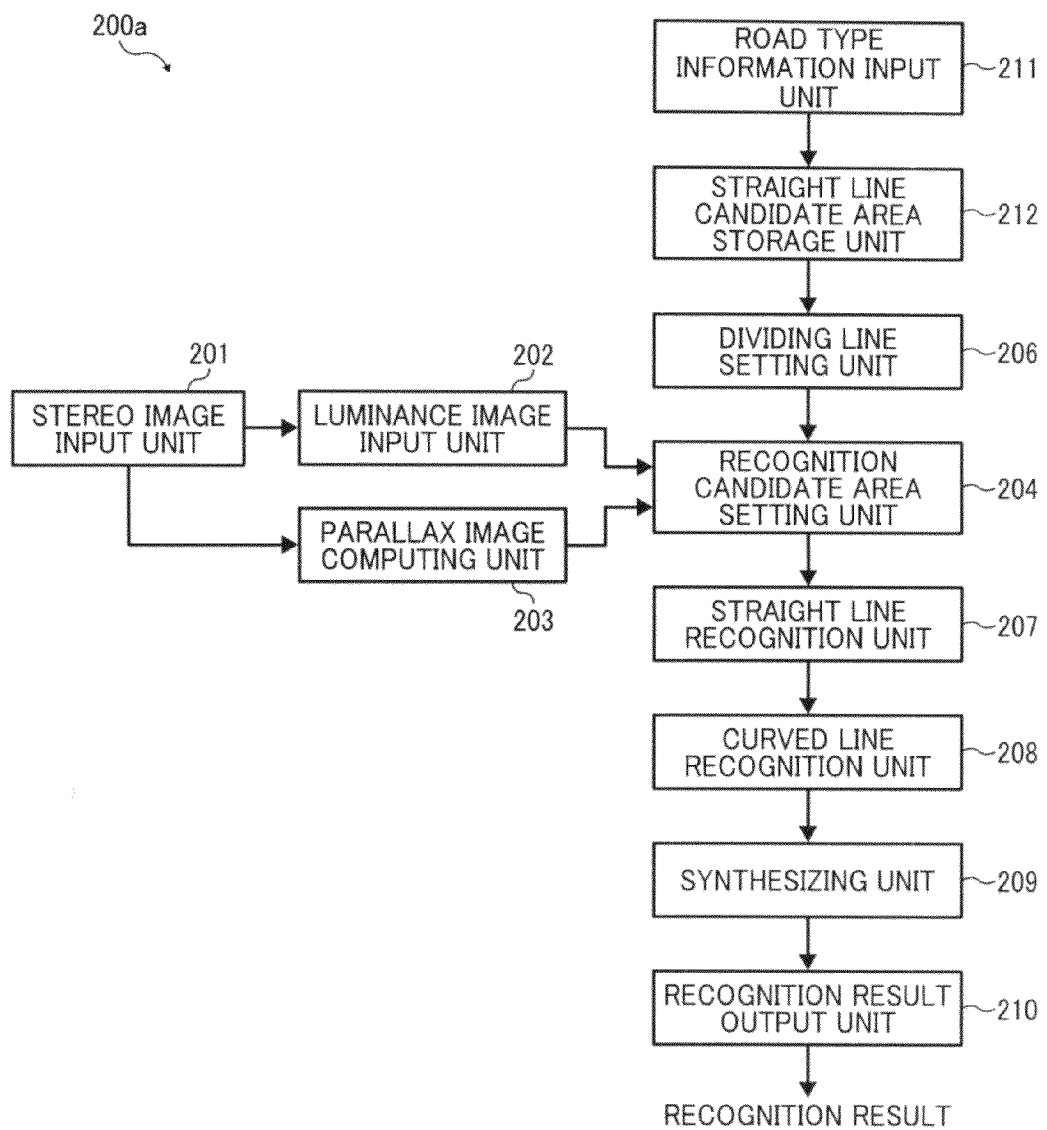
FIG. 15 is a block diagram of a line recognition apparatus of a second example embodiment.

A description is given of another example of a line recognition apparatus of a second example embodiment. FIG. 15 shows a configuration of a line recognition apparatus according to the second example embodiment. Different from the line recognition apparatus 200 of the first example embodiment shown in FIG. 4, a line recognition apparatus 200a shown in FIG. 15 includes a road type information input unit 211 and a straight line candidate area storage unit 212. The line recognition apparatus 200a conducts approximate processing matched to road type such as express highway, urban road, mountain road, sharp curve or the like to recognize lines on a surface where the vehicle is moving more accurately.

The road type information input unit 211 is input with road type information by manual input by a user, or a road type output apparatus. As shown in FIGS. 16A, 16B, 16C and 16D, the straight line candidate area storage unit 212 stores coordinates of the points A, B, C and D that define a straight line candidate area for the left side of the surface on a luminance image, coordinates of the points E, F, G and H that define a straight line candidate area for the right side of the surface on a luminance image, and a parallax threshold that that defines a position of dividing line for each road type.

Figure 17:
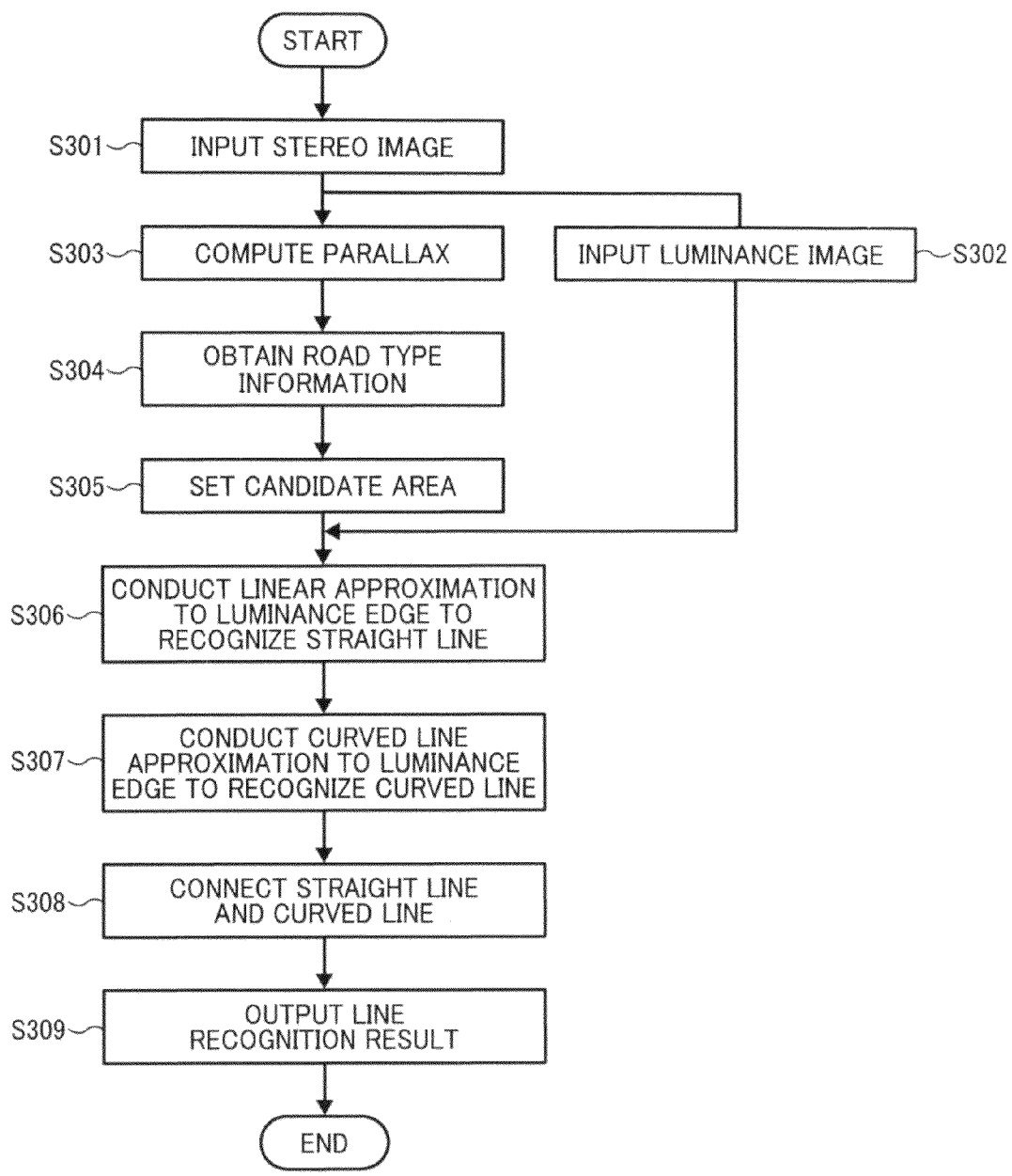
FIG. 17 is a flow chart of a recognition process performed by the line recognition apparatus of the second example embodiment.

A description is given of recognition processing performed by the line recognition apparatus 200a of the second example embodiment with reference to FIG. 17, which is a flow chart of the recognition process. As shown in FIG. 17, the stereo image input unit 201 (FIG. 15) is input with a stereo image of an area captured ahead of the vehicle 100 (step S301). Specifically, as for the stereo image, the same object is focused at different focal positions with the above described left and right image sensors.

Then, a luminance image obtained from one of the left and right images of the stereo image is input to the luminance image input unit 202 (step S302). The input stereo image and luminance image can be stored, for example, in a memory of the stereo camera.

The parallax image computing unit 203 computes parallax, which is a difference of focal positions of each of the left and right images captured for the target object using the stereo image input to the stereo image input unit 201 (step S303).

Then, road type information input to the road type information input unit 211 is obtained (step S304). In view of the obtained road type information, a table is selected from the recognition candidate area tables (see FIGS. 16A to 16D) stored in the straight line candidate area storage unit 205. From the selected recognition candidate area table, coordinates of the points A, B, C and D that define straight line candidate area in the left side of the surface on the luminance image, coordinates of the points E, F, G and H that define straight line candidate area in the right side of the surface on the luminance image, and the parallax threshold that defines a position of dividing line are read.

Based on the read parallax threshold $\Delta TH$, the dividing line setting unit 206 detects pixels having a parallax value, which is the same as the parallax threshold $\Delta TH$ or more, on the parallax image. Among the pixels having the parallax value, which is the same as the parallax threshold $\Delta TH$ or more, a plurality of pixels existing on an upper part of the parallax image are connected to set a virtual horizontal line, and the virtual horizontal line is set as a dividing line.

The recognition candidate area setting unit 204 divides an entire image of the luminance image into two areas using the dividing line as shown in FIG. 9, in which a part lower than the dividing line in the luminance image is referred to as a first surface line candidate area 401, and a part higher than the dividing line in the luminance image is referred to as a second surface line candidate area 402 (step S305).

Further, based on coordinates of the points A and B to define a straight line candidate area for the left side of the surface on the luminance image, stored in the straight line candidate area storage unit 205, coordinates of the points E and F to define a straight line candidate area for the right side of the surface on the luminance image, stored in the straight line candidate area storage unit 205, and the above set dividing line, coordinates of the points A, B, E and F on the luminance image are computed. Further, based on coordinates of the points C and D to define a straight line candidate area for the left side of the surface on the luminance image, stored in the straight line candidate area storage unit 205, and coordinates of the points G and H to define a straight line candidate area for the right side of the surface on the luminance image, stored in the straight line candidate area storage unit 205, coordinates of the points C, D, G, and H on the luminance image are computed.

As shown in FIG. 9A, the first straight line candidate area 403 encircled by the computed points A, B, C and D is set, and the second straight line candidate area 404 encircled by the computed points E, F, G and point H is set. The binary processing is conducted for the first straight line candidate area 403 and the second straight line candidate area 404 to compute a luminance edge. By conducting the linear approximation to the luminance edge using, for example, the Hough conversion, the first straight line 405 for the left side of the surface and the second straight line 406 for the right side of the surface can be recognized (step S306).

Then, the curved line recognition unit 208 conducts an edge extraction processing near the first extension line 407 and the second extension line 408 (FIG. 9) extended from the straight line portions recognized by the straight line unit 207. The curved line approximation using the polynomial approximation is conducted using the edge extraction result (step S307).

The synthesizing unit 209 (FIG. 4) synthesizes the recognized straight line portion and curved line portion on the surface by connecting the straight line portion and curved line portion (step S308).

Figure 11:
FIG. 11 is an image of recognition result.

The recognition result output unit 210 (FIG. 4) outputs a recognition result such as the first recognized line 501 and the second recognized line 502 shown in FIG. 11 (step S309).

With the above described processing of the second example embodiment, an approximate processing matched to the road where the vehicle 100 is moving can be conducted, and the line on the surface where the vehicle 100 is moving can be recognized accurately.

Further, the straight line candidate area table shown in FIGS. 16A to 16D, prepared for each road type such as express highway, urban road, mountain road, sharp curve, can be similarly prepared using the process shown in FIG. 12. Specifically, learning-use line image for each road type is captured, and a straight line candidate area table for each road type is prepared using corresponding sample images. Further, the straight line candidate area table can be prepared in view of variation of road. For example, express highway may be a highway having straight line in most of the highway or a highway having curved portion in most of the highway. In view of such variation, a plurality of straight line candidate area tables may be prepared for one type road such as the express highway.

Figure 18:
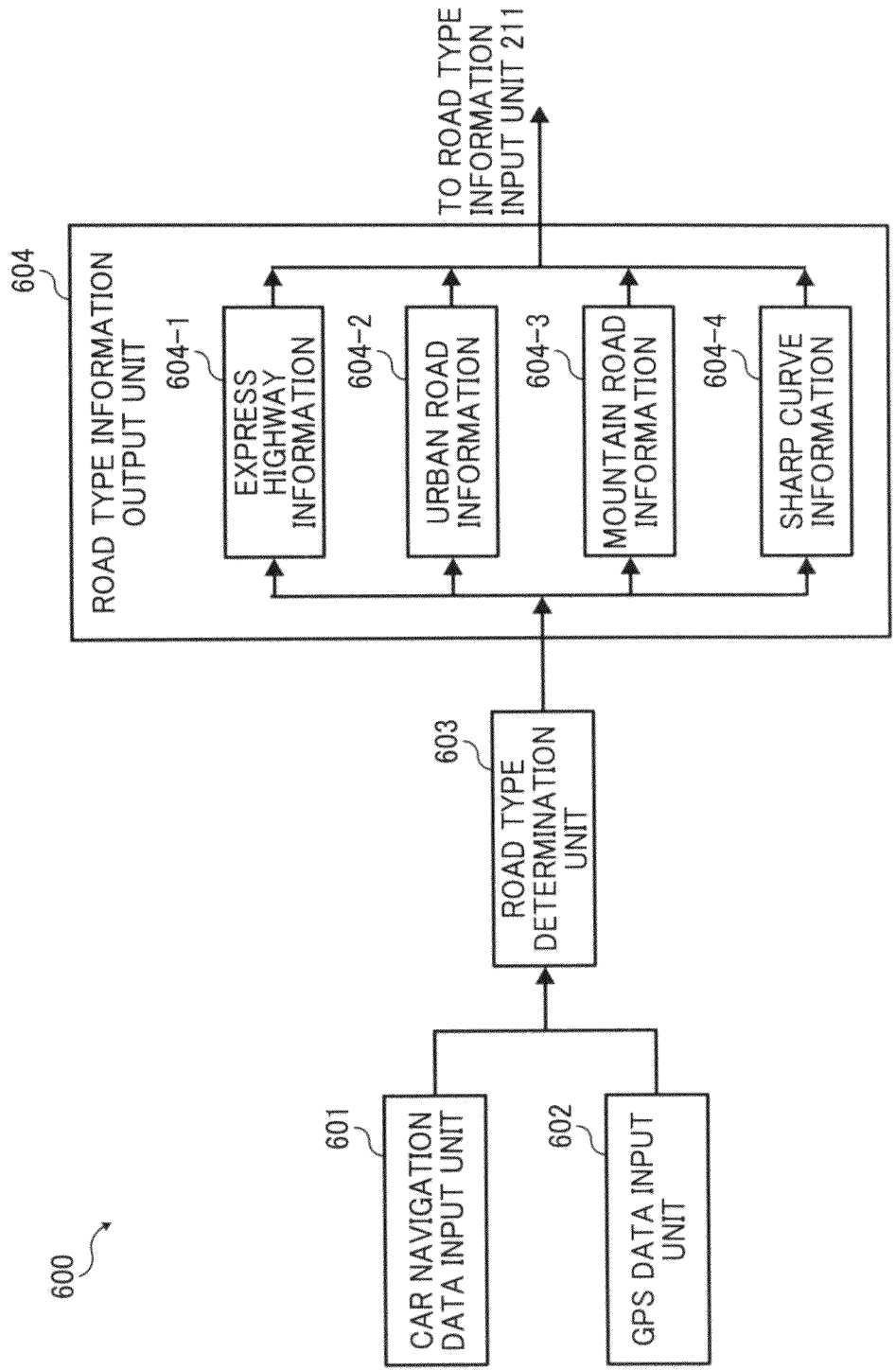
FIG. 18 is a block diagram of a road type information output apparatus.

FIG. 18 shows an example of a block diagram of a road type information output apparatus. As shown in FIG. 18, a road type information output apparatus 600 includes, for example, a car navigation data input unit 601, a global positioning system (GPS) data input unit 602, a road type determination unit 603 and a road type information output unit 604. A vehicle navigation system such as car navigation system includes, for example, a storage, an accelerometer, a gyro sensor, a vehicle speed detector, a steering-wheel angle detector and a main controller. The car navigation data input unit 601 outputs position data of the vehicle 100 to the road type determination unit 603. In the car navigation, the storage such as CD-ROM, HDD or the like stores map data, the accelerometer detects radius of curvature when the vehicle 100 moves along the curve, the gyro sensor detects up and down movement of the vehicle 100, the vehicle speed detector detects the vehicle speed based on rotation signal of wheel, and the steering-wheel angle detector detects the radius of curvature at the curve.

Based on data of radius of curvature, up and down movement, vehicle speed, the car navigation data input unit 601 detects a position of the vehicle 100, and collates the detected position of the vehicle 100 with map data. Then, the car navigation data input unit 601 outputs position data of the vehicle 100 on the map to the road type determination unit 603.

The GPS data input unit 602 obtains position data using the global positioning system (GPS). By using GPS position data, the precision of position data of the vehicle 100 obtained from information of the accelerometer, the gyro sensor, the vehicle speed signal corresponding to the rotation of wheel can be enhanced. The position data of the vehicle 100 is output to the road type determination unit 603.

The road type determination unit 603 can determine or identify the type of road where the vehicle 100 is moving (e.g., running) based on the position data of the vehicle 100 input with map information. Based on the determination result, road type information such as express highway information 604-1, urban road information 604-2, mountain road information 604-3 and sharp curve information 604-4 is output to the road type information input unit 211 (FIG. 15) through the road type information output unit 604. Based on the road type information determined by the road type determination unit 603, a straight line candidate area table corresponding to the determined road type information is selected, and parallax value of straight line and top coordinates of left and right straight line candidate area are read from the selected straight line candidate area table to conduct a straight line extraction processing using the linear approximation.

Figure 19:
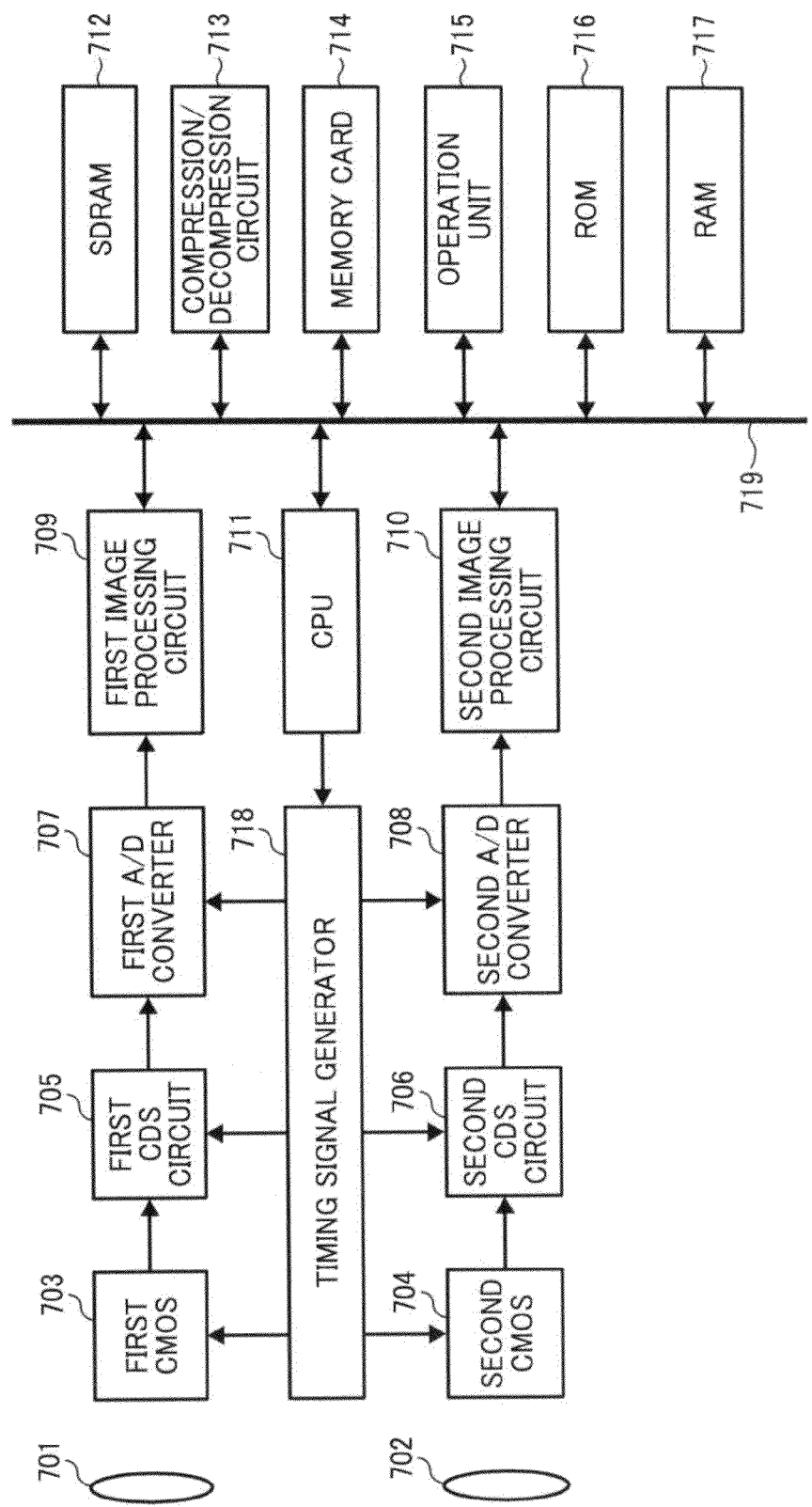
FIG. 19 is a block diagram of a hardware configuration of a stereo camera.

A description is given of a hardware configuration of the stereo camera, which is an example of vehicle-mounted stereo camera that can recognize white line on road surface. FIG. 19 shows a block diagram of a hardware configuration of the stereo camera.

As shown in FIG. 19, light coming from an object passes a first capturing lens 701 and a second capturing lens 702 (corresponding to the first capturing lens 111A and the second capturing lens 111B in FIG. 2) of the stereo camera, and enters a first complementary metal oxide semiconductor (CMOS) 703 and a second CMOS 704 (corresponding to the first image sensor 112A and the second image sensor 112B in FIG. 2). The first CMOS 703 and the second CMOS 704 convert an optical image focused on an image capturing face to electrical signals of analog image data, and outputs the analog image data.

The first signal processor 114A of FIG. 2 includes, for example, a first correlated double sampling (CDS) circuit 705, a first A/D converter 707, and a first image processing circuit 709. The second signal processor 114B of FIG. 2 includes, for example, a second CDS circuit 706, a second A/D converter 708, and a second image processing circuit 710.

The processing hardware 120 and the MPU 140 of FIG. 2 includes, for example, a central processing unit (CPU) 711, a synchronous dynamic random access memory (SDRAM) 712, a compression/decompression circuit 713, a read only memory (ROM) 716, a random access memory (RAM) 717 and a timing signal generator 718.

Noise is removed from the analog image data output from the first CMOS 703 by the first CDS circuit 705, and noise is removed from the analog image data output from the second CMOS 704 by the second CDS circuit 706. Then, the noise-removed analog image data is converted to digital data by the first A/D converter 707 and the second A/D converter 708, and then output to the first image processing circuit 709 and the second image processing circuit 710 respectively.

The first image processing circuit 709 and the second image processing circuit 710 conducts various image processing such as YCrCb conversion processing, white balance processing, contrast correction processing, edge enhancement processing, and color conversion processing using the SDRAM712 storing image data temporarily, in which the white balance processing adjusts density of color of image information, the contrast correction processing adjusts contrast of image information, the edge enhancement processing adjusts sharpness of image information, and the color conversion processing adjusts hue of image information.

Further, the image information having received signal processing and image processing is stored, for example, in a memory card 714 via the compression/decompression circuit 713. The compression/decompression circuit 713 compresses the image information output from the first image processing circuit 709 and the second image processing circuit 710 and outputs compressed image information to the memory card 714, and decompresses the image information read from the memory card 714 and outputs the decompressed image information to the first image processing circuit 709 and the second image processing circuit 710.

Further, operation timing of the first CMOS 703, the second CMOS 704, the first CDS circuit 705, the second CDS circuit 706, the first A/D converter 707, and the second A/D converter 708 are controlled by the CPU 711 via a timing signal generator 718 that generates timing signals.

Further, the first image processing circuit 709, the second image processing circuit 710, the compression/decompression circuit 713, and the memory card 714 are controlled by the CPU 711. As for the image capturing apparatus, the CPU 711 conducts various computing processes using the line recognition program. The CPU 711 includes the ROM 716 and the RAM 717. The ROM 716 is a read only memory that stores image processing program or the like. The RAM 717 can be used as a working area for various computing processes, and includes various data storage area, to which data can be written and read. The CPU 711, the ROM 716 and the RAM 717 can be connected with each other using a bus line 719.

In the above described vehicle-mounted stereo camera, a module for recognizing line is configured. Specifically, the parallax computing is conducted, the recognition candidate area is set based on the luminance image, the straight line portion on the surface is recognized and the curved line portion on the surface is recognized, and the straight line portion and curved line portion on the surface can be synthesized by connecting the straight line portion and curved line portion. In an actual hardware, the CPU 711 reads out image processing program from the ROM 716 and executes the program to load the above each unit on a main storage, and outputs an line recognition result.

The above described example embodiments have following features. In the above described example embodiments, a mobile vehicle such as vehicle 100 moves on a surface such as a road surface and is equipped with an image capturing unit and the line recognition apparatus 200 for recognizing a line on a surface over which the vehicle moves, using an image of an area ahead of the vehicle captured by the image capturing unit mounted on the vehicle. The line recognition apparatus 200 includes the dividing line setting unit 206, the straight line recognition unit 207 and the curved line recognition unit 208.

The dividing line setting unit 206 sets a dividing line in the image area captured ahead of the vehicle to divide the captured image area into a first image area such as the first surface line candidate area 401 corresponding to a road surface close to the vehicle and a second image area 402 such as the second surface line candidate area 402 in the captured image area corresponding to a surface far from the vehicle. The straight line recognition unit 207 conducts a linear approximation to an image in the first surface line candidate area 401 to recognize a straight line in the captured image area such as road surface. The curved line recognition unit 208 conducts a curved line approximation to an image in the second surface line candidate area 402 to recognize a curved line in the captured image area such as road surface. In this configuration, as described in the above example embodiments, when the vehicle 100 is running along a white straight line on a road surface, the white line can be captured as a straight line in a captured image area of the road surface close to the vehicle 100. Further when the vehicle 100 is running along a white curved line on a road surface, the white line can be captured as a straight line in a captured image area of the road surface close to the vehicle 100 while the white line can be captured as a curved line in a captured image area of the road surface far from to the vehicle 100. The dividing line setting unit 206 sets the dividing line to divide or segment the first surface line candidate area 401, which is a captured image area of the road surface close to the vehicle 100, and the second surface line candidate area 402, which is a captured image area of the road surface far from to the vehicle 100. The straight line recognition unit 207 uses linear approximation on the first surface line candidate area 401 to recognize a white line image on a road surface corresponding to a straight line portion or a curved line portion. The curved line recognition unit 208 conducts the curved line approximation to the second surface line candidate area 402 to recognize a white line image on a road surface corresponding to a curved line portion. Therefore, a deviation between the white line image on the road surface and a recognition result of white line image on the road surface can be reduced, with which recognition precision of the white line on the road surface can be enhanced.

In the above described example embodiments, the line recognition apparatus 200 includes a stereo image capturing unit having two image capturing units, and the parallax image computing unit 203, used as a parallax image obtainer, to compute a parallax of the image of an area captured ahead of the vehicle such as the vehicle 100 based on the stereo image to obtain a parallax image. The dividing line setting unit 206 sets a virtual horizontal line on a display screen, corresponding to a given distance from the vehicle as the dividing line based on the parallax image obtained by the parallax image computing unit 203. In this configuration, as described in the above first example embodiment, the captured image area can be divided into the first surface line candidate area 401 and the second surface line candidate area 402 based on the dividing line. With this configuration, the linear approximation is conducted for the first surface line candidate area 401 to recognize a straight line portion of white line on the road surface, and the curved line approximation is conducted for the second surface line candidate area 402 to recognize a curved line portion of white line on the road surface.

In the above described example embodiments, the line recognition apparatus 200 further includes the type information input unit 211 to input information of type of surfaces over which the vehicle moves, and the dividing line setting unit 206 sets the dividing line based on the surface type information input by the type information input unit 211. In this configuration, as described in the above second example embodiment, the dividing line can be set variably depending on type of roads where the vehicle 100 is running. With this configuration, an approximate processing matched to the road surface where the vehicle 100 is running can be conducted, and a white line image on a road surface can be recognized accurately.

In the above described example embodiments, the line recognition apparatus 200 further includes the luminance image input unit 202 as a luminance image obtainer to obtain a luminance image from one of images composing a stereo image captured by the stereo image capturing unit. The dividing line setting unit 206 sets the dividing line based on a difference between an edge of the white line on the road surface extracted from the luminance image obtained by the luminance image input unit 202, and an approximated straight line approximated for extracting the white line on the road surface. In this configuration, as described in the above first example embodiment, the first surface line candidate area 401 and the second surface line candidate area 402 can be set using the dividing line which is set based on the difference between the edge of the white line extracted from the luminance image and an approximated straight line approximated for extracting the white line on the road surface. With this configuration, the straight line portion of white line on the road surface can be recognized with enhanced precision by conducting the linear approximation to the first surface line candidate area 401, and the curved line portion of white line on the road surface—can be recognized with enhanced precision by conducting the curved line approximation to the second surface line candidate area 402.

In the above described example embodiments, the line recognition apparatus 200 further includes the synthesizing unit 209 to synthesize the straight line portion in an image of area captured ahead of the vehicle, recognized by the straight line recognition unit 207 used as a boundary straight line recognition unit, and the curved line portion in an image of area captured ahead of the vehicle, recognized by the curved line recognition unit 208 used as a boundary curved line recognition unit, by connecting the straight line portion and curved line portion, and the recognition result output unit 210 used as a line image output unit to output the synthesized line as a line image on the surface such as road surface. In this configuration, as described in the above example embodiments, by connecting the straight line portion and curved line portion of the white line on the road surface, a recognition result of white line image on the road surface can be generated as an image close to the white line on the road surface, with which the recognition result can be understood easily.

In the above described example embodiments, the straight line recognition unit 207 uses linear approximation on a luminance edge of a luminance image extracted in the first surface line candidate area 401 used as a first image area. In this configuration, as described in the above example embodiments, a straight line image generated in a first recognition candidate area corresponding to the road surface area close to the vehicle 100 can be recognized with enhanced precision.

In the above described example embodiments, the curved line recognition unit 208 sets a search area for searching a candidate curved line portion on the road surface in the second surface line candidate area 402, used as the second image area, using a virtual extension line extended from a straight line portion of white line on the road surface recognized by the straight line recognition unit 207 as a reference line. In this configuration, as described in the above first example embodiment, a curved line image can be searched easily in the second recognition candidate area, and a curved line portion of the white line on the road surface can be recognized with enhanced precision.

In the above described example embodiments, the curved line recognition unit 208 conducts the curved line approximation to a luminance image edge extracted in the second surface line candidate area 402 used as the second image area. In this configuration, as described in the above first example embodiment, a curved line image in the second recognition candidate area on the road surface area far from the vehicle 100 can be recognized with enhanced precision.

In the above described example embodiments, the line recognition apparatus 200 further includes the storage unit 205 to store a parallax threshold, wherein the parallax threshold is obtained based on a difference between an edge of the line extracted from one of images composing the stereo image obtained by the stereo image capturing unit and an approximated straight line approximated for extracting the line in the image of an area captured ahead of the vehicle. The dividing line setting unit 206 sets the dividing line based on the parallax threshold stored in the storage unit 205. The image capturing unit 101 used as a stereo image capturing unit captures a stereo image by taking two images such as the left and right images. The parallax threshold is obtained based on a difference between an edge of white line on the road surface extracted from one of two images of the stereo image obtained by the image capturing unit 101 and the approximated straight line approximated for extracting the white line on the road surface, and the straight line candidate area storage unit 205 stores the parallax threshold. The recognition candidate area setting unit 204 sets the first surface line candidate area 401 and the second surface line candidate area 402 based on the parallax threshold stored in the straight line candidate area storage unit 205. In this configuration, as described in the above example embodiments, because the first surface line candidate area 401 and the second surface line candidate area 402 can be set accurately, the straight line portion and curved line portion of the white line on the road surface can be recognized with enhanced precision.

In the above described example embodiments, a stereo image composed a right side image and a left side image can be captured for a plurality of images by the stereo image capturing unit having the image capturing unit 101. A plurality of straight lines is approximated to extract the white line for each of a plurality of either left or right side images of the stereo images on the road surface, and the line candidate area is obtained based on the plurality of approximated straight lines. The straight line candidate area storage unit 205 stores information indicating a candidate area of road surface included in the first recognition candidate area based on the plurality of approximated straight lines. The straight line recognition unit 207 conducts a linear approximation to the candidate area indicated by the information stored in the straight line candidate area storage unit 205 to recognize the white line on the road surface. In this configuration, as described in the above example embodiments, by setting the first surface line candidate area 401 and the second surface line candidate area 402, the straight line portion and curved line portion of the white line on the road surface can be recognized with enhanced precision.

In the above described example embodiments, the straight line candidate area storage unit 212 includes a plurality of preset memory tables set for each surface type such as road type, and each of the memory tables stores coordinates of points on a display screen to set a position of the dividing line, which can be obtained from a sample image of each surface type such as road type. In this configuration, as described in the above second example embodiment, one or more of tables are read in view of the surface type such as road type over which the vehicle 100 moves, and a position of dividing line can be changed based on coordinates of points on the display screen stored in the table. With this configuration, an approximate processing matched to the road type where the vehicle 100 moves can be conducted, and the white line on the road surface can be recognized accurately.

In the above described example embodiments, the road type information input unit 211, used as a surface type information input unit, is input with the surface type that the vehicle moves over such as road type information determined based on position information of the vehicle 100 obtained with a vehicle navigation system such as car navigation system and map data. In this configuration, as described in the above second example embodiment, position data of the vehicle 100 input to the car navigation data input unit 601 is collated with map data, and position data of the vehicle 100 on the map is output to the road type determination unit 603. Based on the input position data of the vehicle 100 on the map, the road type determination unit 603 determines the road type on which the vehicle 100 moves. With this configuration, an approximate processing matched to the road where the vehicle 100 moves over can be conducted, and the white line on a road surface can be recognized accurately.

In the above described example embodiments, the road type information input unit 211 obtains position information of the vehicle 100 using GPS. The road type information input unit 211 is input with road type information determined based on position information of the vehicle 100 obtained by GPS, position information of the vehicle 100 obtained by the car navigation, and map data. In this configuration, as described in the above second example embodiment, the detected position of the vehicle 100 is collated with map data, and then position data of the vehicle 100 on the map is output to the road type determination unit 603. The GPS data input unit 602 obtains UPS position data, and the precision of position data of the vehicle 100 for self-contained navigation can be enhanced based on the GPS position data and then output to the road type determination unit 603. Based on the input position data of the vehicle 100 on the map, the road type determination unit 603 determines the road type on the map that the vehicle 100 is running. With this configuration, the road type that the vehicle 100 is running can be determined with enhanced precision and automatically.

In the above described example embodiments, the vehicle control system includes the line recognition apparatus 200 for recognizing a line on a surface over which the vehicle moves, using an image of an area ahead of the vehicle captured by the image capturing unit mounted on the vehicle, and the vehicle drive control unit 104 as the vehicle controller that controls one or more devices disposed on the vehicle based on a recognition result of the line recognition apparatus 200. In this configuration, as described in the above example embodiments, the one or more devices disposed on the vehicle can be controlled with high precision.

In the above described example embodiments, a method of recognizing a line on a surface over which a vehicle moves, using an image of an area ahead of the vehicle captured by an image capturing unit mounted on the vehicle can be conducted. The method includes the steps of setting a dividing line in the captured image area of the vehicle to divide the captured image area into the first surface line candidate area 401 (first image area) corresponding to a road surface close to the vehicle and the second surface line candidate area 402 (second image area) in the captured image area corresponding to a surface far from the vehicle; conducting a linear approximation to an image in the first surface line candidate area 401 to recognize a straight line portion in the captured image area; and conducting a curved line approximation to an image in the second surface line candidate area 402 to recognize a curved line portion in the captured image area. In this configuration, as described in the above example embodiments, a deviation between the white line image on the road surface and a recognition result of white line image on the road surface can be reduced, with which recognition precision of white line on a road surface can be enhanced.

In the above described example embodiments, a non-transitory computer-readable carrier medium or storage medium storing a line recognition program that, when executed by a computer having a processor, causes the computer to execute a method of recognizing a line on a surface over which a vehicle moves, using an image of an area ahead of the vehicle captured by an image capturing unit mounted on the vehicle can be devised. The method includes the steps of conducting a linear approximation to an image in the first surface line candidate area 401 to recognize a straight line portion in the captured image area; and conducting a curved line approximation to an image in the second surface line candidate area 402 to recognize a curved line portion in the captured image area. In this configuration, as described in the above second example embodiments, a deviation between the white line image on the road surface and a recognition result of white line image on the road surface can be reduced, with which recognition precision of white line on a road surface can be enhanced.

In the above described example embodiments, the line recognition apparatus, line recognition method and the line recognition program can reduce a deviation between a line image and the recognition result of the recognized line image, and can enhance line recognition precision on the surface.

The program can be distributed by storing the program in a storage medium or carrier medium such as CD-ROM. Further, the program can be distributed by transmitting signals from a given transmission device via a transmission medium such as communication line or network (e.g., public phone line, specific line) and receiving the signals. When transmitting signals, a part of data of the program is transmitted in the transmission medium, which means, entire data of the program is not required to be on in the transmission medium. The signal for transmitting the program is a given carrier wave of data signal including the program. Further, the program can be distributed from a given transmission device by transmitting data of program continually or intermittently.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic Tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java®, JavaScript®, Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A line recognition apparatus for recognizing a line on a surface over which a vehicle moves, using an image of an area ahead of the vehicle captured by an image capturing unit mounted to the vehicle, the line recognition apparatus comprising:
    circuitry configured as
    a type information input unit to input surface type information of surfaces over which the vehicle moves;
    a dividing line setting unit to set a dividing line, based on the input surface type information, in the captured image area ahead of the vehicle to divide the captured image area into a first image area corresponding to a surface close to the vehicle and a second image area in the captured image area corresponding to a surface far from the vehicle;
    a straight line recognition unit to conduct a linear approximation to an image in the first image area to recognize a straight line in the captured image area ahead of the vehicle; and
    a curved line recognition unit to conduct a curved line approximation to an image in the second image area to recognize a curved line in the captured image area ahead of the vehicle.

2. The line recognition apparatus of claim 1, wherein the circuitry is further configured as
    a stereo image capturing unit having two image capturing units and capturing a stereo image; and
    a parallax image computing unit to compute parallax of the captured image area ahead of the vehicle based on the stereo image to obtain a parallax image,
    wherein the dividing line setting unit sets a virtual horizontal line, corresponding to a given distance from the vehicle, on a display screen as the dividing line based on the parallax image obtained by the parallax image computing unit.

3. The line recognition apparatus of claim 2, wherein the circuitry is further configured as
    a luminance image obtainer to obtain a luminance image from one of images composing a stereo image captured by the stereo image capturing unit,
    wherein the dividing line setting unit sets the dividing line based on a difference between an edge of the line extracted from the luminance image obtained by the luminance image obtainer and an approximated straight line approximated for extracting the line.

4. The line recognition apparatus of claim 2 wherein the circuitry is further configured as a storage unit to store a parallax threshold, wherein the parallax threshold is obtained based on a difference between an edge of a line extracted from one of images of the stereo image obtained by the stereo image capturing unit and an approximated straight line approximated for extracting the line,
    wherein the dividing line setting unit sets the dividing line based on the parallax threshold stored in the storage unit.

5. The line recognition apparatus of claim 4, wherein the storage unit stores information indicating a line candidate area on a surface included in the first image area,
    wherein a stereo image composed of a right side image and a left side image is captured for a plurality of images by the stereo image capturing unit, a plurality of straight lines is approximated for extracting the line for each of a plurality of either left or right side images of the stereo images, and the line candidate area is obtained based on the plurality of approximated straight lines,
    wherein the straight line recognition unit conducts a linear approximation to an image in the line candidate area indicated by the information stored in the storage unit.

6. The line recognition apparatus of claim 5, wherein the storage unit comprises a plurality of preset memory tables set for each surface type, wherein each of the memory tables stores a parallax threshold obtained from a sample image for each surface type and coordinates of points to set a position of the dividing line on the display screen.

7. The line recognition apparatus of claim 1, wherein the circuitry is further configured as a synthesizing unit to synthesize the straight line of the captured image area ahead of the vehicle recognized by the straight line recognition unit and the curved line of the captured image area ahead of the vehicle recognized by the curved line recognition unit by connecting the straight line and curved line; and a line image output unit to output the synthesized line as a line image in the captured image area ahead of the vehicle.

8. The line recognition apparatus of claim 1, wherein the straight line recognition unit conducts a linear approximation to an edge of a luminance image extracted in the first image area.

9. The line recognition apparatus of claim 1, wherein the curved line recognition unit sets a search area for searching a candidate curved line in the captured image area ahead of the vehicle in the second image area using a virtual extension line extended from a straight line recognized by the straight line recognition unit as a reference line.

10. The line recognition apparatus of claim 9, wherein the curved line recognition unit conducts a curved line approximation to an edge of a luminance image extracted in the second image area.

11. The line recognition apparatus of claim 1, wherein the type information input unit is input with road type information determined based on position information of the vehicle obtained by a vehicle navigation system and map data.

12. The line recognition apparatus of claim 1, wherein the type information input unit obtains position information of the vehicle by global positioning system (GPS), wherein the type information input unit is input with road type information which is determined based on the position information of the vehicle obtained by the GPS, position information of the vehicle obtained by a vehicle navigation system, and map data.

13. A vehicle control system, comprising:

the line recognition apparatus of claim 1; and a vehicle controller to control one or more devices disposed on the vehicle based on a recognition result of the line recognition apparatus.

14. A method of recognizing a line on a surface over which a vehicle moves, using an image of an area ahead of the vehicle captured by an image capturing unit mounted on the vehicle, the method comprising the steps of:

inputting surface type information of surfaces over which the vehicle moves;

setting a dividing line, based on the input surface type information, in the captured image area ahead of the vehicle to divide the captured image area into a first image area corresponding to a surface close to the vehicle and a second image area in the captured image area corresponding to a surface far from the vehicle;

conducting a linear approximation to an image in the first image area to recognize a straight line in the captured image area; and conducting a curved line approximation to an image in the second image area to recognize a curved line in the captured image area.

15. A non-transitory computer-readable storage medium storing a line recognition program that, when executed by a computer having a processor, causes the computer to execute a method of recognizing a line on a surface over which a vehicle moves, using an image of an area ahead of the vehicle captured by an image capturing unit mounted on the vehicle, the method comprising the steps of:

inputting surface type information of surfaces over which the vehicle moves;

setting a dividing line, based on the surface type information, in the captured image area ahead of the vehicle to divide the captured image area into a first image area corresponding to a surface close to the vehicle and a second image area in the captured image area corresponding to a surface far from the vehicle;

conducting a linear approximation to an image in the first image area to recognize a straight line in the captured image area; and conducting a curved line approximation to an image in the second image area to recognize a curved line in the captured image area.

16. A line recognition apparatus for recognizing a line on a surface over which a vehicle moves, using an image of an area ahead of the vehicle captured by an image capturing unit mounted to the vehicle, the line recognition apparatus comprising:

circuitry configured as a dividing line setting unit to set a dividing line in the captured image area ahead of the vehicle to divide the captured image area into a first image area corresponding to a surface close to the vehicle and a second image area in the captured image area corresponding to a surface far from the vehicle;

a straight line recognition unit to conduct a linear approximation to an image in the first image area to recognize a straight line in the captured image area ahead of the vehicle;

a curved line recognition unit to conduct a curved line approximation to an image in the second image area to recognize a curved line in the captured image area ahead of the vehicle; and a storage unit to store a plurality of preset memory tables set for each surface type, wherein each of the memory tables stores a parallax threshold obtained from a sample image for each surface type and coordinates of points to set a position of the dividing line on a display screen.

17. A line recognition apparatus for recognizing a line on a surface over which a vehicle moves, using an image of an area ahead of the vehicle captured by an image capturing unit mounted to the vehicle, the line recognition apparatus comprising:

circuitry configured as a type information input unit to input surface type information of surfaces over which the vehicle moves;

a dividing line setting unit to set a dividing line, based on the input surface type information, in the captured image area ahead of the vehicle to divide the captured image area into a first image area corresponding to a surface close to the vehicle and a second image area in the captured image area corresponding to a surface far from the vehicle;

a straight line recognition unit to conduct a linear approximation to an image in the first image area to recognize a straight line in the captured image area ahead of the vehicle;

a curved line recognition unit to conduct a curved line approximation to an image in the second image area to recognize a curved line in the captured image area ahead of the vehicle; and a storage unit to store a plurality of preset memory tables set for each surface type, wherein each of the memory tables stores a parallax threshold obtained from a sample image for each surface type and coordinates of points to set a position of the dividing line on a display screen.

* * * * *